(12) United States Patent
Muruganathan et al.

(10) Patent No.: US 12,355,698 B2
(45) Date of Patent: Jul. 8, 2025

(54) NON-CODEBOOK BASED MULTI-TRP PUSCH RELIABILITY WITH MULTIPLE ASSOCIATED NZP CSI-RSs

(71) Applicant: Telefonaktiebolaget LM Ericsson (publ), Stockholm (SE)

(72) Inventors: Siva Muruganathan, Stittsville (CA); Shiwei Gao, Nepean (CA); Mattias Frenne, Uppsala (SE); Simon Järmyr, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 17/798,922

(22) PCT Filed: Feb. 11, 2021

(86) PCT No.: PCT/IB2021/051146
§ 371 (c)(1),
(2) Date: Aug. 11, 2022

(87) PCT Pub. No.: WO2021/161223
PCT Pub. Date: Aug. 19, 2021

(65) Prior Publication Data
US 2023/0063015 A1 Mar. 2, 2023

Related U.S. Application Data

(60) Provisional application No. 62/976,152, filed on Feb. 13, 2020.

(51) Int. Cl.
*H04W 4/00* (2018.01)
*H04L 5/00* (2006.01)
*H04W 72/23* (2023.01)

(52) U.S. Cl.
CPC ........... *H04L 5/0051* (2013.01); *H04W 72/23* (2023.01)

(58) Field of Classification Search
CPC ..... H04L 5/0051; H04L 5/005; H04L 5/0048; H04L 72/23; H04L 76/00; H04L 52/325;
(Continued)

(56) References Cited

U.S. PATENT DOCUMENTS

| 11,728,947 B2 * | 8/2023 | Khoshnevisan ...... H04L 5/0051 370/329 |
| 2019/0181976 A1 | 6/2019 | Golitschek Edler Von Elbwart |

(Continued)

FOREIGN PATENT DOCUMENTS

| CN | 110535614 A | 12/2019 |
| CN | 110536399 A | 12/2019 |

(Continued)

OTHER PUBLICATIONS

Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.

(Continued)

*Primary Examiner* — Abdelnabi O Musa
(74) *Attorney, Agent, or Firm* — Withrow & Terranova, PLLC

(57) ABSTRACT

Systems and methods for non-codebook based multiple transmission and reception point (TRP) Physical Uplink Shared Channel (PUSCH) transmission and reception are disclosed herein. In one embodiment, a method performed by a wireless communication device comprises receiving a configuration of first and second Sounding Reference Signal (SRS) resource sets to be used for non-codebook based PUSCH transmission. The method further comprises receiv- (Continued)

ing a configuration of first and second Non-Zero Power (NZP) Channel State Information Reference Signals (CSI-RSs) associated with the first and SRS resource sets, respectively. The method further comprises receiving a request for transmitting data in PUSCH in a plurality of occasions, wherein the request comprises first and second SRS resource indicators (SRIs) associated with the first and second SRS resource sets, respectively. The method further comprises transmitting first and second PUSCHs in a first and second sets of occasions according to the first and second SRIs, respectively.

25 Claims, 15 Drawing Sheets

(58) Field of Classification Search
CPC ...... H04L 24/08; H04W 72/23; H04W 76/00; H04W 52/325; H04W 24/08
See application file for complete search history.

(56) References Cited

U.S. PATENT DOCUMENTS

| | | | |
|---|---|---|---|
| 2020/0059961 | A1 | 2/2020 | Do et al. |
| 2020/0107353 | A1 | 4/2020 | Jung et al. |
| 2020/0162289 | A1* | 5/2020 | Ahn ..................... H04L 5/0053 |
| 2020/0351129 | A1* | 11/2020 | Kwak .................. H04W 80/02 |
| 2020/0389885 | A1* | 12/2020 | Tomeba ................ H04W 72/21 |
| 2021/0144720 | A1* | 5/2021 | Xu ........................ H04L 5/0051 |
| 2021/0195627 | A1 | 6/2021 | Chen et al. |
| 2021/0212101 | A1 | 7/2021 | Jiang et al. |
| 2021/0234588 | A1 | 7/2021 | Li et al. |
| 2021/0307070 | A1* | 9/2021 | Kim .................... H04L 25/0226 |
| 2022/0039028 | A1* | 2/2022 | Wernersson ........ H04W 52/325 |
| 2022/0166587 | A1 | 5/2022 | Go et al. |
| 2022/0201696 | A1 | 6/2022 | Go et al. |
| 2022/0393744 | A1 | 12/2022 | Karjalainen et al. |
| 2023/0023719 | A1* | 1/2023 | Ji ......................... H04W 16/28 |
| 2024/0031097 | A1* | 1/2024 | Go ....................... H04L 5/0094 |
| 2024/0056986 | A1* | 2/2024 | Jeon ..................... H04W 76/00 |

FOREIGN PATENT DOCUMENTS

| | | |
|---|---|---|
| EP | 3567967 A1 | 11/2019 |
| JP | 2012100232 A | 5/2012 |
| WO | 2019237983 A1 | 12/2019 |
| WO | 2020019317 A1 | 1/2020 |
| WO | 2021026230 A1 | 2/2021 |
| WO | 2021161272 A1 | 8/2021 |

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 page.
Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.
CATT, "R1-1812636: Enhancements on multi-beam operation," 3GPP TSG RAN WG1 Meeting #95, Nov. 12-16, 2018, Spokane, Washington, 9 pages.
CEWIT, "R1-1813373: Non-codebook based UL transmission enhancement in Rel. 16," 3GPP TSG RAN WG1 Meeting #95, Nov. 12-16, 2018, Spokane, Washington, 6 pages.
ZTE, "R1-1908270: Draft alignment CR on non-codebook based PUSCH," 3GPP TSG RAN WG1 Meeting #98, Aug. 26-30, 2019, Prague, Czech Republic, 4 pages.
International Search Report and Written Opinion for International Patent Application No. PCT/IB2021/051217, mailed May 10, 2021, 15 pages.
International Search Report and Written Opinion for International Patent Application No. PCT/IB2021/051146, mailed Mar. 23, 2021, 17 pages.
Written Opinion for International Patent Application No. PCT/IB2021/051146, mailed Jan. 18, 2022, 9 pages.
International Preliminary Report on Patentability for International Patent Application No. PCT/IB2021/051146, mailed May 24, 2022, 35 pages.
Author Unknown, "Technical Specification Group Radio Access Network; NR; User Equipment (UE) radio access capabilities (Release 15)," Technical Specification 38.306, Version 15.8.0, Dec. 2019, 3GPP Organizational Partners, 60 pages.
Notice of Reasons for Refusal for Japanese Patent Application No. 2022-547151, mailed Mar. 22, 2024, 9 pages.
CATT, "R1-1810516: Remaining issues on multi-antenna scheme," 3GPP TSG RAN WG1 Meeting #94bis, Oct. 8-12, 2018, Chengdu, China, 7 pages.
Nokia, et al., "R1-1811840: Summary of Issues on UL non-codebook based transmission," 3GPP TSG RAN WG1 Meeting #94bis, Oct. 8-12, 2018, Chengdu, China, 16 pages.
Decision to Grant for Japanese Patent Application No. 2022-547151, mailed Aug. 13, 2024, 6 pages.
Ericsson, "R1-2101654: On PDCCH, PUCCH and PUSCH enhancements," 3GPP TSG-RAN WG1 Meeting #104e, Jan. 26-Feb. 12, 2021, Electronic Meeting, 24 pages.
Huawei, et al., "R1-1905270: Reliability enhancement on PUCCH & PUSCH with multi-TRP/panel," 3GPP TSG RAN WG1 meeting #96b, Apr. 8-12, 2019, Xi'an, China, 2 pages.
Huawei, et al., "R1-1913300: Summary of Proposals for M-TRP Online Section on Tuesday," 3GPP TSG RAN WG1 Meeting #99, Nov. 18-22, 2019, Reno, Nevada, 5 pages.
Lenovo, et al., "R1-1906276: Discussion on UL multi-panel transmission," 3GPP TSG RAN WG1 Meeting #97, May 13-17, 2019, Reno, Nevada, 8 pages.
Notice of Reasons for Refusal for Japanese Patent Application No. 2022-547151, mailed Aug. 25, 2023, 5 pages.
Intention to Grant for European Patent Application No. 21707022.6, mailed Oct. 11, 2024, 8 pages.
Non-Final Office Action for U.S. Appl. No. 17/798,974, mailed Oct. 31, 2024, 37 pages.

\* cited by examiner

```
-- ASN1START
-- TAG-SRS-CONFIG-START

SRS-ResourceSet ::=       SEQUENCE {
   srs-ResourceSetId           SRS-ResourceSetId,
   srs-ResourceIdList          SEQUENCE (SIZE(1..maxNrofSRS-ResourcesPerSet)) OF SRS-ResourceId    OPTIONAL, -- Cond Setup
   resourceType                CHOICE {
      aperiodic                SEQUENCE {
         aperiodicSRS-ResourceTrigger    INTEGER (1..maxNrofSRS-TriggerStates-1),
         csi-RS                          NZP-CSI-RS-ResourceId                 OPTIONAL, -- Cond NonCodebook
         slotOffset                      INTEGER (1..32)
                                                                               OPTIONAL, -- Need S
         ...,
         aperiodicSRS-ResourceTriggerList    SEQUENCE (SIZE(1..maxNrofSRS-TriggerStates-2))
                                                  OF INTEGER (1..maxNrofSRS-TriggerStates-1)   OPTIONAL -- Need M
      ]]
   },
   semi-persistent             SEQUENCE {
      associatedCSI-RS         NZP-CSI-RS-ResourceId                          OPTIONAL, -- Cond NonCodebook
      ...
   },
   periodic                    SEQUENCE {
      associatedCSI-RS         NZP-CSI-RS-ResourceId                          OPTIONAL, -- Cond NonCodebook
      ...
   }
},
usage                          ENUMERATED {beamManagement, codebook, nonCodebook, antennaSwitching},
alpha                                                                         OPTIONAL, -- Need S
```

FIG. 3

NON-CODEBOOK BASED MULTI-TRP PUSCH RELIABILITY WITH MULTIPLE ASSOCIATED NZP CSI-RSs

RELATED APPLICATIONS

This application is a 35 U.S.C. § 371 national phase filing of International Application No. PCT/IB2021/051146, filed Feb. 11, 2021, which claims the benefit of provisional patent application Ser. No. 62/976,152, filed Feb. 13, 2020, the disclosures of which are hereby incorporated herein by reference in their entireties.

TECHNICAL FIELD

The present disclosure relates to non-codebook based uplink transmission in a cellular communications system.

BACKGROUND

New Radio (NR) Frame Structure and Resource Grid

Third Generation Partnership Project (3GPP) New Radio (NR) uses Cyclic Prefix Orthogonal Frequency Division Multiplexing (CP-OFDM) in both downlink (DL) (i.e., from a network node, gNB, or base station, to a user equipment or UE) and uplink (UL) (i.e., from UE to gNB). Discrete Fourier Transform (DFT) spread Orthogonal Frequency Division Multiplexing (OFDM) is also supported in the uplink. In the time domain, NR downlink and uplink are organized into equally sized subframes of 1 millisecond (ms) each. A subframe is further divided into multiple slots of equal duration. The slot length depends on subcarrier spacing. For subcarrier spacing of $\Delta f=15$ kilohertz (kHz), there is only one slot per subframe, and each slot consists of fourteen (14) Orthogonal Frequency Division Multiplexing (OFDM) symbols.

Data scheduling in NR is typically in slot basis. An example is shown in FIG. 1 with a 14-symbol slot, where the first two symbols contain Physical Downlink Control Channel (PDCCH) and the rest contains physical shared data channel, i.e., either Physical Downlink Shared Channel (PDSCH) or Physical Uplink Shared Channel (PUSCH).

Different subcarrier spacing values are supported in NR. The supported subcarrier spacing values, which are also referred to as different numerologies, are given by $\Delta f=(15 \times 2^\mu)$ kHz where $\in \{0, 1, 2, 3, 4\}$. $\Delta f=15$ kHz is the basic subcarrier spacing. The slot durations at different subcarrier spacings is given by $$\frac{1}{2^\mu} ms.$$

In the frequency domain, a system bandwidth is divided into Resource Blocks (RBs), each corresponds to twelve (12) contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

In NR Release 15, uplink data transmission can be dynamically scheduled using PDCCH. A UE first decodes uplink grants in PDCCH and then transmits data over PUSCH based the decoded control information in the uplink grant such as modulation order, coding rate, uplink resource allocation, etc. In dynamic scheduling of PUSCH, there is also a possibility to configure semi-persistent transmission of PUSCH using configured grants (CGs). There are two types of CG based PUSCH defined in NR Release 15, namely, CG type 1 and CG type 2. In CG type 1, a periodicity of PUSCH transmission as well as the time domain offset are configured by Radio Resource Control (RRC). In CG type 2, a periodicity of PUSCH transmission is configured by RRC, and then the activation and release of such transmission is controlled by Downlink Control Information (DCI), i.e. with a PDCCH.

In NR, it is possible to schedule a PUSCH with time repetition by the RRC parameter pusch-AggregationFactor for dynamically scheduled PUSCH and repK for PUSCH with UL configured grant. In this case, the PUSCH is scheduled but transmitted in multiple adjacent slots if the slot is available for UL transmission, up until the number of repetitions as determined by the configured RRC parameter.

In the case of PUSCH with UL configured grant, the redundancy version (RV) sequence to be used is configured by the repK-RV field when repetitions are used. If repetitions are not used for PUSCH with UL configured grant, then the repK-RV field is absent.

In NR Release-15, there are two mapping types supported, Type A and Type B, that are applicable to PDSCH and PUSCH transmissions. Type A transmissions are usually referred to as slot-based transmissions, while Type B transmissions may be referred to as non-slot-based or mini-slot-based transmissions.

Mini-slot transmissions can be dynamically scheduled and, for NR Release 15:
  can be of length 7, 4, or 2 symbols for downlink, while it
    can be of any length for uplink, and
  can start and end in any symbol within a slot.
Note that mini-slot transmissions in NR Release 15 may not cross the slot-border.

One of the two frequency hopping modes, inter-slot and intra-slot frequency hopping, can be configured via higher layer for PUSCH transmission in NR Release 15, in the Information Element (IE) PUSCH-Config for dynamic transmission or IE configuredGrantConfig for CG Type 1 and CG Type 2.

Spatial Relation Definition

Spatial relation is used in NR to refer to a relationship between an UL Reference Signal (RS) to be transmitted such as Physical Uplink Control Channel (PUCCH)/PUSCH Demodulation Reference Signal (DMRS) and another previously transmitted or received RS, which can be either a DL RS (Channel State Information Reference Signal (CSI-RS) or Synchronization Signal Block (SSB)) or an UL RS (Sounding Reference Signal (SRS)). This is defined from a UE perspective.

If an UL transmitted RS is spatially related to a DL RS, this means that the UE should transmit the UL RS in the opposite (reciprocal) direction from which it received the DL RS previously. More precisely, the UE should apply the "same" Transmit (Tx) spatial filtering configuration for the transmission of the UL RS as the Rx spatial filtering configuration it used to receive the spatially related DL RS previously. Here, the terminology 'spatial filtering configuration' may refer to the antenna weights that are applied at either the transmitter or the receiver for data/control transmission/reception. Another way to describe this is that the same "beam" should be used to transmit the signal from the UE as was used to receive the previous DL RS signal. The DL RS is also referred as the spatial filter reference signal.

On the other hand, if a first UL RS is spatially related to a second UL RS, then the UE should apply the same Tx spatial filtering configuration for the transmission for the first UL RS as the Tx spatial filtering configuration it used to transmit the second UL RS previously. In other words, same beam is used to transmit the first and second UL RSs, respectively.

Since the UL RS is associated with a layer of PUSCH or PUCCH transmission, it is understood that the PUSCH/PUCCH is also transmitted with the same TX spatial filter as the associated UL RS.

PUSCH Transmission Schemes

In NR, there are two transmission schemes specified for PUSCH, namely, a codebook based PUSCH transmission scheme and a non-codebook based PUSCH transmission scheme.

The codebook based PUSCH transmission scheme is used on both NR and LTE and was motivated to be used for non-calibrated UEs and/or UL Frequency Division Duplex (FDD). Codebook based PUSCH in NR is enabled if higher layer parameter txConfig=codebook. For dynamically scheduled PUSCH and configured grant PUSCH type 2, the codebook based PUSCH transmission scheme can be summarized as follows:

The UE transmits one or two SRS resources (i.e., one or two SRS resources configured in the SRS resource set associated with the higher layer parameter usage of value 'CodeBook'). Note that in NR Release 15/16, the number of SRS resource sets with higher layer parameter usage set to 'CodeBook' is limited to one (i.e., only one SRS resource set is allowed to be configured for the purposes of codebook based PUSCH transmission).

The gNB determines a preferred Multiple Input Multiple Output (MIMO) transmit precoder for PUSCH (i.e., transmit precoding matrix indicator or TPMI) from a codebook and the associated number of layers corresponding to the one or two SRS resources.

The gNB indicates a selected SRS resource via a 1-bit 'SRS resource indicator' field if two SRS resources are configured in the SRS resource set. The 'SRS resource indicator' field is not indicated in DCI if only one SRS resource is configured in the SRS resource set.

The gNB indicates a TPMI and the associated number of layers corresponding to the indicated SRS resource (in case two SRS resources are used) or the configured SRS resource (in case one SRS resource is used). TPMI and the number of PUSCH layers is indicated by the 'Precoding information and number of layers' field in DCI formats 0_1 and 0_2.

The UE performs PUSCH transmission using the TPMI and number of layers indicated. If one SRS resource is configured in the SRS resource set associated with the higher layer parameter usage of value 'CodeBook', then the PUSCH DMRS is spatially related to the most recent SRS transmission in this SRS resource. If two SRS resources are configured in the SRS resource set associated with the higher layer parameter usage of value 'CodeBook', then the PUSCH DMRS is spatially related to the most recent SRS transmission in the SRS resource indicated by the 'SRS resource indicator' field.

The TPMI is used to indicate the precoder to be applied over the layers $\{0 \ldots v-1\}$ and that corresponds to the SRS resource selected by the SRI when multiple SRS resources are configured, or if a single SRS resource is configured TPMI is used to indicate the precoder to be applied over the layers $\{0 \ldots v-1\}$ and that corresponds to the SRS resource. The transmission precoder is selected from the uplink codebook that has a number of antenna ports equal to higher layer parameter nrofSRS-Ports in SRS-Config.

Non-Codebook based PUSCH transmission is available in NR, enabling reciprocity-based UL transmission. Non-Codebook based PUSCH in NR is enabled if higher layer parameter txConfig=noncodebook. Note that in NR Release 15/16, the number of SRS resource sets with higher layer parameter usage set to 'nonCodeBook' is limited to one (i.e., only one SRS resource set is allowed to be configured for the purposes of non-Codebook based PUSCH transmission). The maximum number of SRS resources that can be configured for non-codebook based uplink transmission is four (4).

With regards to non-codebook based PUSCH, the following is specified in 3GPP TS 38.214 V16.0.0:

"For non-codebook based transmission, the UE can calculate the precoder used for the transmission of SRS based on measurement of an associated NZP CSI-RS resource. A UE can be configured with only one NZP CSI-RS resource for the SRS resource set with higher layer parameter usage in SRS-ResourceSet set to 'non-Codebook' if configured."

Hence, for non-codebook based PUSCH transmission, only one Non-Zero Power (NZP) CSI-RS resource is configured in the SRS resource set, and the UE can calculate the precoder used for the transmission of SRS using this associated NZP CSI-RS resource. The single NZP CSI-RS resource configured per SRS resource set is part of the SRS-Config information element and is shown in FIG. 3. The condition 'NonCodebook' means that the associated NZP CSI-RS is optionally present in case of the SRS resource set configured with usage set to 'nonCodeBook', otherwise the field is absent.

It is further specified in 3GPP TS 38.214 that if the UE is configured with an SRS resource set with an associated NZP CSI-RS resource, then the UE is not expected to be configured with spatial relation information in any of the SRS resources in the SRS resource set.

In NR, for non-codebook based PUSCH, the UE performs a one-to-one mapping from the indicated SRI(s) to the indicated DM-RS port(s) and their corresponding PUSCH layers $\{0 \ldots v-1\}$ in increasing order. The UE shall transmit PUSCH using the same antenna ports as the SRS port(s) in the SRS resource(s) indicated by SRI(s), where the SRS port in (i+1)-th SRS resource in the SRS resource set is indexed as $p_i = 1000+i$.

NR Release 16 PUSCH Enhancements

In NR Release 16, PUSCH repetition enhancements were made for both PUSCH type A and type B for the purposes of further latency reduction (i.e., for Release 16 Ultra-Reliable Low-Latency Communication (URLLC)).

In regard to PUSCH repetition type A (slot based) enhancement, in NR Release 15, the number of aggregated slots for both dynamic grant and configured grant Type 2 are RRC configured. In NR Release 16, this was enhanced so that the number of repetitions can be dynamically indicated, i.e. change from one PUSCH scheduling occasion to the next. That is, in addition to the starting symbol S and the length of the PUSCH L, a number of nominal repetitions K is signaled as part of time-domain resource allocation (TDRA). Furthermore, the maximum number of aggregated slots was increased to K=16 to account for DL heavy Time Division Duplexing (TDD) patterns. Inter-slot and intra-slot hopping can be applied for Type A repetition. The number of repetitions K is nominal since some slots may be DL slots and are then skipped for PUSCH transmissions. So, K is the maximal number of repetitions possible.

In regard to PUSCH repetition type B (mini-slot based) enhancements, PUSCH repetition Type B applies both to dynamic and configured grants. Type B PUSCH repetition can cross the slot boundary in Rel-16. When scheduling a transmission with PUSCH repetition Type B, in addition to the starting symbol S and the length of the PUSCH L, a number of nominal repetitions K is signaled as part of TDRA in NR Release 16. Inter-slot frequency hopping and inter-repetition frequency hopping can be configured for Type B repetition. To determine the actual time domain allocation of Type B PUSCH repetitions, a two-step process is used:

1. Allocate K nominal repetitions of length L back-to-back (adjacent in time), ignoring slot boundaries and TDD pattern.
2. If a nominal repetition crosses a slot boundary or occupies symbols not usable for UL transmission (e.g., UL/DL switching points due to TDD pattern), the offending nominal repetition may be split into two or more shorter actual repetitions. If the number of potentially valid symbols for PUSCH repetition type B transmission is greater than zero for a nominal repetition, the nominal repetition consists of one or more actual repetitions, where each actual repetition consists of a consecutive set of potentially valid symbols that can be used for PUSCH repetition Type B transmission within a slot.

Although the term 'PUSCH repetition' is used in this document, it can be interchangeably used with other terms such as 'PUSCH transmission occasion'.

In NR Rel-15/16, when PUSCH is repeated according to PUSCH repetition Type A or Type B, the PUSCH is limited to a single transmission layer.

Another NR Release 16 PUSCH enhancement relates to redundancy version (RV). The channel encoder can be controlled by the RV. In NR, an information payload can be encoded with four different RVs to allow for incremental redundancy decoding. The redundancy version to be applied on the nth transmission occasion of the Transport Block (TB), where n=0, 1, ... K−1, is determined according to Table 1 below.

TABLE 1

Redundancy version for PUSCH transmission.

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

SUMMARY

Systems and methods for non-codebook based multiple transmission and reception point (TRP) Physical Uplink Shared Channel (PUSCH) transmission and reception are disclosed herein. In one embodiment, a method performed by a wireless communication device comprises receiving, from a network node, a configuration of a first Sounding Reference Signal (SRS) resource set to be used for non-codebook based PUSCH transmission and a second SRS resource set to be used for non-codebook based PUSCH transmission. The method further comprises receiving, from the network node, a configuration of a first Non-Zero Power (NZP) Channel State Information Reference Signal (CSI-RS) associated with the first SRS resource set and a second NZP CSI-RS associated with the second SRS resource set. The method further comprises receiving a request for transmitting data in PUSCH in a plurality of occasions, wherein the request comprises a first SRS resource indicator (SRI) associated with the first SRS resource set and a second SRI associated with the second SRS resource set. The method further comprises transmitting a first PUSCH in a first set of occasions according to the first SRI and a second PUSCH in a second set of occasions according to the second SRI. In one embodiment, the first SRS resource set is associated with a first TRP and the second SRS resource set is associated with a second TRP. In this manner, non-codebook based multi-TRP PUSCH transmission is provided.

In one embodiment, the first SRI indicates one or more SRS resources in the first SRS resource set and the second SRI indicates one or more SRS resources in the second SRS resource set.

In one embodiment, the first PUSCH and the second PUSCH carry a same block of data.

In one embodiment, the first set of occasions and the second set of occasions comprise a first set of time occasions and a second set of time occasions, respectively.

In one embodiment, a first occasion from the first set of occasions and a second occasion from the second set of occasions are in different time slots. In one embodiment, the first and the second sets of time occasions are interleaved in time, wherein for a total of N slots starting at slot n+1, the first set of time occasions comprises slots {n+mD+1, ... n+ (m+1) D; m=0, 2, ..., 2(M−1)} while the second set of time occasions comprises slots {n+mD+1, ... n+ (m+1)D; m=1, 3, ..., 2(M−1)+1}, wherein $$M = \left\lfloor \left\lceil \frac{N}{D} \right\rceil /2 \right\rfloor$$

and D is a positive integer. In one embodiment, the request further comprises the total of N slots.

In one embodiment, a first occasion from the first set of occasions and a second occasion from the second set of occasion are in different symbols within a same slot.

In one embodiment, the first and the second SRIs indicate a same number of SRS resources in the first SRS resource set and the second SRS resource set, respectively. In one embodiment, a single SRS resource in each of the first and the second SRS resource sets is indicated by the first SRI and the second SRI, respectively.

In one embodiment, the number of SRS resources indicated in the first SRI and the second SRI is a wireless communication device capability reported by the wireless communication device to the network node.

In one embodiment, the first SRS resource set is associated with a first phase tracking reference signal, PTRS, port and the second SRS resource set is associated with a second PTRS port.

In one embodiment, transmitting the first PUSCH in the first set of occasions according to the first SRI and the second PUSCH in the second set of occasions according to the second SRI comprises transmitting the first PUSCH on antenna port(s) that correspond to the one or more SRS resources indicated by the first SRI in the first SRS resource set and transmitting the second PUSCH on antenna port(s) that correspond to the one or more SRS resources indicated by the second SRI in the second SRS resource set.

In one embodiment, the method further comprises transmitting a first set of layers of a PUSCH on antenna ports that correspond to SRS resources in the first SRS resource set and transmitting a second set of layers of the PUSCH on antenna ports that correspond to SRS resources in the second SRS resource set.

In one embodiment, the request is contained in a Downlink Control Information (DCI) that schedules the PUSCH transmission. In one embodiment, the DCI contains a first SRI field for indicating the first SRI and a second SRI field for indicating the second SRI. In another embodiment, the DCI contains a single SRI field for both the first SRI and the second SRI.

In one embodiment, the request is contained in a radio resource control (RRC) configuration for a configured grant.

In one embodiment, the first SRS resource set is associated with a first higher layer parameter configured by the network node to indicate, to the wireless communication device, to use non-codebook based PUSCH for uplink transmissions associated with the first SRS resource set, and the second SRS resource set is associated with a second higher layer parameter configured by the network node to indicate, to the wireless communication device, to use non-codebook based PUSCH for uplink transmissions associated with the second SRS resource set.

In one embodiment, the first NZP CSI-RS and the second NZP CSI-RS have the same time-domain behavior. In one embodiment, the time domain behavior is one of aperiodic, semi-persistent, and periodic.

Corresponding embodiments of a wireless communication device are also disclosed. In one embodiment, a wireless communication device is adapted to receive, from a network node, a configuration of a first SRS resource set to be used for non-codebook based PUSCH transmission and a second SRS resource set to be used for non-codebook based PUSCH transmission and receive, from the network node, a configuration of a first NZP CSI-RS associated with the first SRS resource set and a second NZP CSI-RS associated with the second SRS resource set. The wireless communication device is further adapted to receive a request for transmitting data in PUSCH in a plurality of time occasions, wherein the request comprises a first SRS resource indicator (SRI) associated with the first SRS resource set and a second SRI associated with the second SRS resource set. The wireless communication device is further adapted to transmit a first PUSCH in a first set of occasions according to the first SRI and a second PUSCH in a second set of occasions according to the second SRI.

In one embodiment, a wireless communication device comprises one or more transmitters, one or more receivers, and processing circuitry associated with the one or more transmitters and the one or more receivers. The processing circuitry is configured to cause the wireless communication device to receive, from a network node, a configuration of a first SRS resource set to be used for non-codebook based PUSCH transmission and a second SRS resource set to be used for non-codebook based PUSCH transmission and receive, from the network node, a configuration of a first NZP CSI-RS associated with the first SRS resource set and a second NZP CSI-RS associated with the second SRS resource set. The processing circuitry is further configured to cause the wireless communication device to receive a request for transmitting data in PUSCH in a plurality of time occasions, wherein the request comprises a first SRS resource indicator (SRI) associated with the first SRS resource set and a second SRI associated with the second SRS resource set. The processing circuitry is further configured to cause the wireless communication device to transmit a first PUSCH in a first set of occasions according to the first SRI and a second PUSCH in a second set of occasions according to the second SRI.

In one embodiment, the first SRI indicates one or more SRS resources in the first SRS resource set and the second SRI indicates one or more SRS resources in the second SRS resource set.

In one embodiment, the first PUSCH and the second PUSCH carry a same block of data.

In one embodiment, the first set of occasions and the second set of occasions comprise a first set of time occasions and a second set of time occasions, respectively.

In one embodiment, a first occasion from the first set of occasions and a second occasion from the second set of occasions are in different time slots.

In one embodiment, a first occasion from the first set of occasions and a second occasion from the second set of occasion are in different symbols within a same slot.

In one embodiment, the processing circuitry is further configured to cause the wireless communication device to transmit the first PUSCH on antenna port(s) that correspond to one or more SRS resources indicated by the first SRI in the first SRS resource set and transmit the second PUSCH on antenna port(s) that correspond to one or more SRS resources indicated by the second SRI in the second SRS resource set.

In one embodiment, the processing circuitry is further configured to cause the wireless communication device to transmit a first set of layers of a PUSCH on antenna port(s) that correspond to one or more SRS resources indicated by the first SRI in the first SRS resource set and transmit a second set of layers of the PUSCH on antenna ports that correspond to one or more SRS resources indicated by the second SRI in the second SRS resource set.

In one embodiment, the processing circuitry is further configured to cause the wireless communication device to receive the request in a DCI that schedules the PUSCH transmission. In one embodiment, the DCI contains a first SRI field for the first SRI and a second SRI field for the second SRI. In one embodiment, the DCI contains a single SRI field for both the first SRI and the second SRI.

In one embodiment, the first SRS resource set is associated with a first higher layer parameter configured by the network node to indicate, to the wireless communication device, to use non-codebook based PUSCH for uplink transmissions associated with the first SRS resource set, and the second SRS resource set is associated with a second higher layer parameter configured by the network node to indicate, to the wireless communication device, to use non-codebook based PUSCH for uplink transmissions associated with the second SRS resource set.

Embodiments of a method performed by a network node are also disclosed. In one embodiment, a method performed by a network node comprises providing, to a wireless communication device, a configuration of a first SRS resource set to be used for non-codebook based PUSCH transmission and a second SRS resource set to be used for non-codebook based PUSCH transmission and providing, to the wireless communication device, a configuration of a first NZP CSI-RS associated with the first SRS resource set and a second NZP CSI-RS associated with the second SRS resource set. The method further comprises transmitting, to the wireless communication device, a request for transmitting data in PUSCH in a plurality of occasions, wherein the request comprises a first SRI associated with the first SRS resource set and a second SRI associated with the second SRS resource set. The method further comprises receiving a first PUSCH in a first set of occasions with a first TRP and a second PUSCH in a second set of occasions with a second TRP.

In one embodiment, the first SRI indicates one or more SRS resources in the first SRS resource set and the second SRI indicates one or more SRS resources in the second SRS resource set.

In one embodiment, the first PUSCH and the second PUSCH carry a same block of data.

In one embodiment, the first set of occasions and the second set of occasions comprise a first set of time occasions and a second set of time occasions, respectively.

In one embodiment, a first occasion from the first set of occasions and a second occasion from the second set of occasions are in different time slots.

In one embodiment, a first occasion from the first set of occasions and a second occasion from the second set of occasion are in different symbols within a same slot.

In one embodiment, the first and the second TRPs are associated with the first and the second SRS groups, respectively.

In one embodiment, the request is contained in a DCI that schedules the PUSCH transmission. In one embodiment, the DCI contains a first SRI field for the first SRI and a second SRI field for the second SRI. In another embodiment, the DCI contains a single SRI field for both the first SRI and the second SRI.

In one embodiment, the first SRS resource set is associated with a first higher layer parameter configured by the network node to indicate, to the wireless communication device, to use non-codebook based PUSCH for uplink transmissions associated with the first SRS resource set, and the second SRS resource set is associated with a second higher layer parameter configured by the network node to indicate, to the wireless communication device, to use non-codebook based PUSCH for uplink transmissions associated with the second SRS resource set.

Corresponding embodiments of a network node are also disclosed. In one embodiment, a network node is adapted to provide, to a wireless communication device, a configuration of a first SRS resource set to be used for non-codebook based PUSCH transmission and a second SRS resource set to be used for non-codebook based PUSCH transmission and provide, to the wireless communication device, a configuration of a first NZP CSI-RS associated with the first SRS resource set and a second NZP CSI-RS associated with the second SRS resource set. The network node is further adapted to transmit, to the wireless communication device, a request for transmitting data in PUSCH in a plurality of occasions, wherein the request comprises a first SRI associated with the first SRS resource set and a second SRI associated with the second SRS resource set. The network node is further adapted to receive a first PUSCH in a first set of occasions with a first TRP and a second PUSCH in a second set of occasions with a second TRP.

In one embodiment, a network node comprises processing circuitry configured to cause the network node to provide, to a wireless communication device, a configuration of a first SRS resource set to be used for non-codebook based PUSCH transmission and a second SRS resource set to be used for non-codebook based PUSCH transmission and provide, to the wireless communication device, a configuration of a first NZP CSI-RS associated with the first SRS resource set and a second NZP CSI-RS associated with the second SRS resource set. The processing circuitry is further configured to cause the network node to transmit, to the wireless communication device, a request for transmitting data in PUSCH in a plurality of occasions, wherein the request comprises a first SRI associated with the first SRS resource set and a second SRI associated with the second SRS resource set. The processing circuitry is further configured to cause the network node to receive a first PUSCH in a first set of occasions with a first TRP and a second PUSCH in a second set of occasions with a second TRP.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates the Sounding Reference Signal (SRS) configuration information element defined in Third Generation Partnership Project (3GPP) NR specifications;

DETAILED DESCRIPTION

Figure 1:
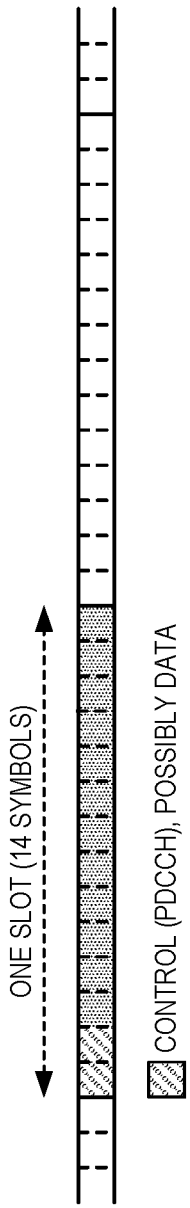
FIG. 1 illustrates an example of a New Radio (NR) slot.
Figure 2:
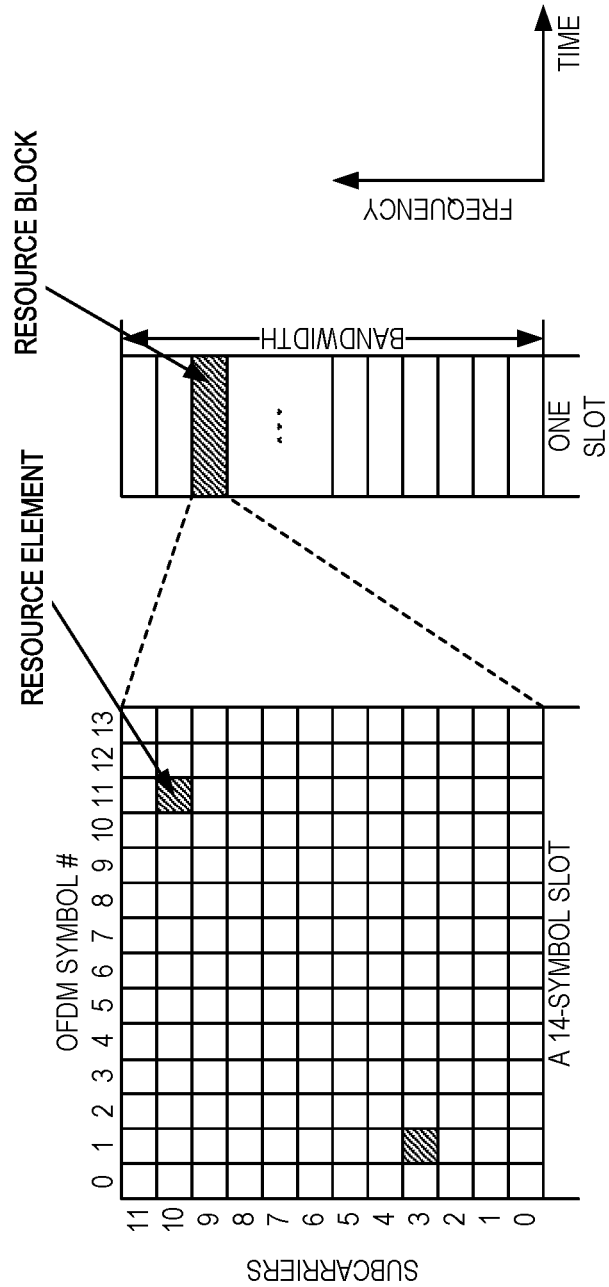
FIG. 2 illustrates the basic NR physical time-frequency resource grid.

Some of the embodiments contemplated herein will now be described more fully with reference to the accompanying drawings. Other embodiments, however, are contained within the scope of the subject matter disclosed herein; the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system. In some embodiments, a TRP may be either a network node, a radio head, a spatial relation, or a Transmission Configuration Indicator (TCI) state. A TRP may be represented by a spatial relation, a SRS resource set or a TCI state in some embodiments. In some embodiments, a TRP may a part of the gNB transmitting and receiving radio signals to/from UE according to physical layer properties and parameters inherent to that element.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). NR support only one Sounding Reference Signal (SRS) resource set for non-codebook based Physical Uplink Shared Channel (PUSCH) transmission and only one associated Non-Zero Power (NZP) Channel State Information Reference Signal (CSI-RS) which the UE uses to calculate the precoder used for the transmission of SRS. The solution in NR only supports PUSCH transmission towards a single Transmission/Reception Point (TRP) or single Receive (RX) beam at the network side.

Hence, it is a problem in NR that the PUSCH transmission cannot be received with multiple TRPs if the UE use beamforming for transmission, i.e. the beam width is narrow and can only point toward a single TRP when transmitting. This problem implies that peak throughput for PUSCH is limited and/or the reliability is limited. It is not possible to transmit to more than one TRP at a time.

Certain aspects of the present disclosure and their embodiments may provide solutions to the aforementioned or other challenges. The proposed solutions introduce N NZP CSI-RS to be associated with either NV SRS resource groups or NV SRS resource sets, thus enabling each NZP CSI-RS resource to be used to calculate precoders corresponding to N TRPs. The value of Nis preferably greater than 1 (e.g., 2, 3, etc.). The calculated precoder layers can be used to transmit PUSCH layers targeting these N TRPs. This enables the non-codebook based PUSCH transmission to be used for multi-TRP which is not supported in NR.

There are, proposed herein, various embodiments which address one or more of the issues disclosed herein. Some examples embodiments are as follows:

Embodiment 1: A method performed by a wireless device for transmitting non-codebook based PUSCH, the method comprising one or more of the following:
  a. receiving a configuration from a network node of a first SRS resource group and a second SRS resource group to be used for non-codebook based PUSCH transmission;
  b. receiving a configuration from a network node of a first NZP CSI-RS associated with the first SRS resource group and a second NZP CSI-RS associated with the second SRS resource group;
  c. receiving the first NZP CSI-RS and the second NZP CSI-RS;
  d. calculating a first precoder on the first NZP CSI-RS and a second precoder on the second NZP CSI-RS;
  e. transmitting layers of the first precoder on SRS resources from the first SRS resource group and transmitting layers of the second precoder on SRS resources from the SRS resource second group;
  f. receiving a Downlink Control Information (DCI) scheduling the non-codebook based PUSCH transmission, the DCI containing a SRS Resource Indicator (SRI) field indicating SRS resources from at least one of the first and second SRS resource groups;
  g. transmitting each PUSCH layer using the precoder layers associated with the SRS resources indicated in the SRI field.

Embodiment 2: The method of embodiment 1 wherein the non-codebook based PUSCH transmission is comprised of a plurality of repetitions.

Embodiment 3: The method of any of embodiments 1-2 wherein, if the SRI field indicates SRS resources from the first SRS resource group, the PUSCH transmission in a first sub-set of repetitions among the plurality of repetitions uses the precoder layers associated with the SRS resources in the first SRS resource group.

Embodiment 4: The method of any of embodiments 1-3 wherein, if the SRI field indicates SRS resources from the second SRS resource group, the PUSCH transmission in a second sub-set of repetitions among the plurality of repetitions uses the precoder layers associated with the SRS resources in the second SRS resource group;

Embodiment 5: The method of any of embodiments 1-4 wherein the first sub-set of repetitions corresponds to all the plurality repetitions if the SRI field indicates SRS resources from only the first SRS resource group;

Embodiment 6: The method of any of embodiments 1-5 wherein the second sub-set of repetitions corresponds to all the plurality repetitions if the SRI field indicates SRS resources from only the second SRS resource group;

Embodiment 7: The method of any of embodiments 1-6 wherein the first SRS resource group corresponds to a first SRS resource set, and the second SRS resource group corresponds to a second SRS resource set.

Certain embodiments may provide one or more of the following technical advantage(s). The advantage of the solution is that PUSCH can be transmitted with improved reception at multiple TRPs simultaneously or repetitively using non-codebook based PUSCH. This improves the peak throughput and/or the reliability of the transmissions.

Figure 4:
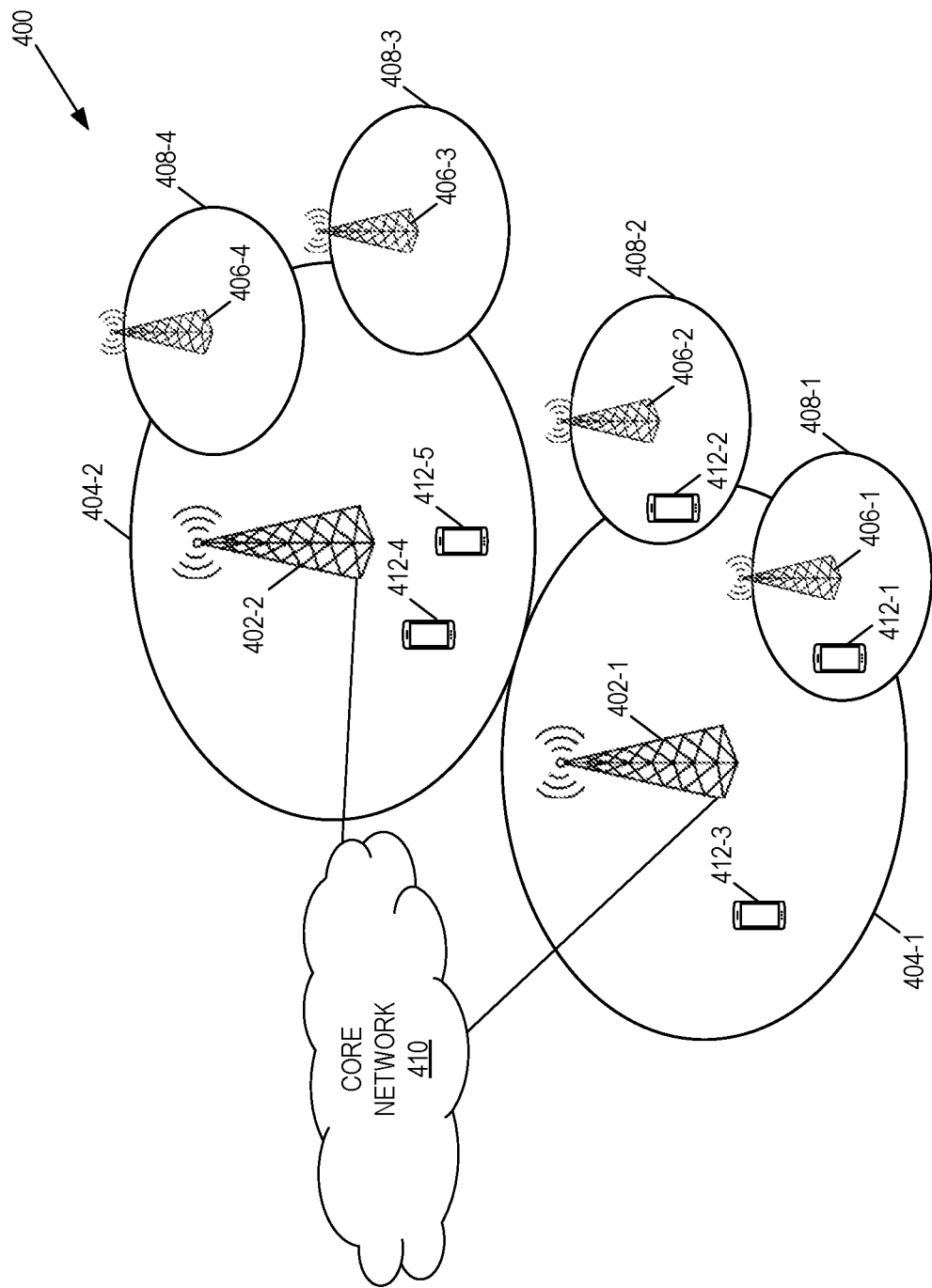
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a NR RAN. In this example, the RAN includes base stations 402-1 and 402-2, which in 5G NR are referred to as gNBs, controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs and as such the wireless communication devices 412 are sometimes referred to herein as UEs 412, but the present disclosure is not limited thereto.

Some example embodiments of the present disclosure will now be provided. While sometimes described separately, these embodiments may be used in any desired combination unless otherwise stated or required.

Embodiment 1: Configuring Multiple NZP CSI-RS Resources Via Multiple SRS Resource Groups within a Single SRS Resource Set In this embodiment, the SRS resources in an SRS resource set are grouped into two or more different SRS resource groups, and there are two or more NZP CSI-RS resources associated with the SRS resource set. A first NZP CSI-RS resource is associated with the first SRS resource group, a second NZP CSI-RS resource is associated with the second SRS resource group, and so on.

Figure 5:
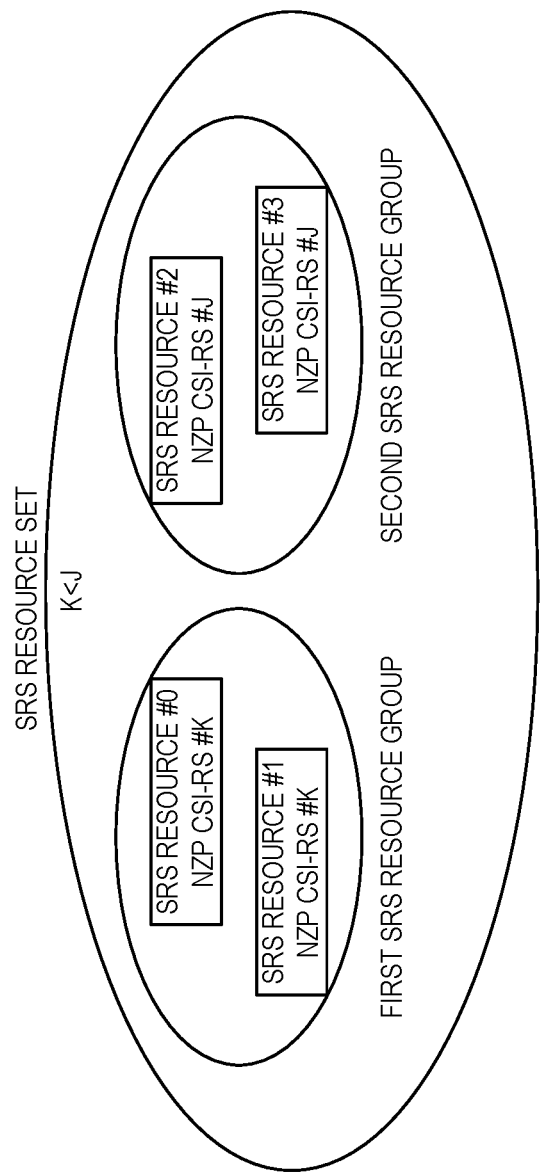
FIG. 5 illustrates an example embodiment of the present disclosure in which there are two SRS resource groups in a SRS resource set, and SRS resources in each group are configured with a same Non-Zero Power (NZP) Channel State Information Reference Signal (CSI-RS) resource (i.e., resource ID)

In one embodiment, an SRS resource group is identified by an NZP CSI-RS resource as part of spatial relation information configuration (i.e., higher layer parameter SRS-SpatialRelationInfo) for each SRS resource in the SRS resource set. For example, one of two NZP CSI-RS resources may be configured as the reference signal for each SRS resource SRS-SpatialRelationInfo. The first SRS resource group may include SRS resources configured with a NZP CSI-RS resource having a smaller value of NZP CSI-RS resource ID and the second SRS resource group may include SRS resources configured with a NZP CSI-RS resource having a larger value of NZP CSI-RS resource ID. An example is shown in FIG. 5. In particular, FIG. 5 illustrates an example in which there are two SRS resource groups in an SRS resource set, and SRS resources in each group are configured with a same NZP CSI-RS resource (i.e., resource ID). More generally, the $n^{th}$ SRS resource group is associated with the $n^{th}$ NZP CSI-RS resource ID ordered, e.g. in increasing order.

In some embodiments, K different NZP CSI-RS resource IDs are configured. Then, to associate an SRS resource in the SRS resource set with a NZP CSI-RS resource, an indication of one of the NZP CSI-RS resources is included as part of SRS resource configuration. This indication may be the ID of the NZP CSI-RS resource or an index k (k=1, 2, ..., K) representing the kth associated NZP CSI-RS resource configured as part the SRS Resource Set.

In the following, the description assumes two TRPs and hence two SRS resource groups, but it can without loss of generality be extended to more than two such groups to support reception by more than two TRPs.

An NZP CSI-RS is received by the UE in the corresponding NZP CSI-RS resource, and the NZP CSI-RS resource configuration contains detailed parameters associated with the NZP CSI-RS (e.g., number of ports, Code Division Multiplexing (CDM) groups, density, etc.). An SRS is transmitted by the UE in the corresponding SRS resource, and the SRS resource configuration contains detailed parameters associated with the SRS (e.g., number of ports, occupied symbols in a slot, etc.). The parameters can be conveyed for example via RRC.

While receiving the first NZP CSI-RS (i.e., while receiving a NZP CSI-RS on the first NZP CSI-RS resource), the UE measures and calculates a first SRS precoder based on the first NZP CSI-RS associated with the first SRS resource group. In other words, the UE performs measurements on the first NZP CSI-RS associated with the first SRS resource group and calculates the first SRS precoder based on the measurements performed on the first NZP CSI-RS. Similarly, while receiving the second NZP CSI-RS, the UE measures and calculates a second SRS precoder based on the second NZP CSI-RS associated with the second SRS resource group. The first/second NZP CSI-RS may be periodic (e.g., configured by gNB to UE via RRC), or may be semi-persistent (e.g., configured by gNB to UE via RRC and activated by MAC CE), or may be aperiodic (e.g., configured by gNB to UE via RRC and triggered by DCI). In some embodiments, the two associated NZP CSI-RS resources have the same time-domain behavior (i.e., both of them are periodic, semi-persistent, or aperiodic).

In some embodiments, the UE then transmits a first PUSCH or a first set of layers of a PUSCH on antenna ports corresponding to SRS resources in the first SRS group and transmits a second PUSCH or a second set of layers of a PUSCH on antenna ports corresponding to SRS resources in the second SRS group. In some other embodiments, UE transmits layers of the first precoder on SRS resources from the first SRS group and transmits layers of the second precoder on SRS resources from the second SRS group. In another scenario, the UE may transmit a first set of layers of a PUSCH using antenna ports corresponding to SRS resources in the first SRS group and transmit a second set of layers of the PUSCH using antenna ports corresponding to SRS resources in the second SRS group. A single layer is transmitted using an antenna port corresponding to each SRS resource. In some embodiments, the number of antenna ports or layers transmitted from each SRS group has to be the same (e.g., 1 layer on one SRS resource from the $1^{st}$ SRS group and 1 layer on a second SRS resource from the $2^{nd}$ SRS group).

The UE may also choose to transmit PUSCH using layers of a single SRS group only, if it decides that the path loss to the TRP associated with the second SRS group is too weak. Hence, the UE can autonomously switch between PUSCH transmission toward the first TRP, the second TRP, or both TRPs, depending on how it selects resources from different groups correspondingly.

In another embodiment, one Phase Tracking Reference Signal (PTRS) port is associated with each SRS resource group. If the UE selects layers of PUSCH on SRS resources in the first SRS group and transmits a second PUSCH or a second set of layers of a PUSCH on SRS resources in the second SRS group, it will transmit two PTRS ports, one per SRS group. If it selects only layers from a single SRS group, it transmits only a single PTRS port.

The gNB measures the SRS transmitted by the UE in each SRS resource group and determines the desired SRS resources for non-codebook based PUSCH transmission over SRS ports in the corresponding SRS resource group. The determined SRS resources are then indicated to the UE via an SRI field as part of a DCI scheduling a non-codebook based PUSCH transmission. The SRI field may also indicate the SRS resource group or groups in addition to the SRS resource(s) in each group. The non-codebook based PUSCH transmission may consist of a plurality of repetitions where each repetition may be over a slot (i.e., type A PUSCH) or a subset of symbols within a slot (i.e., type B PUSCH).

If the SRI field in DCI indicates SRS resources from both the $1^{st}$ SRS group and the $2^{nd}$ SRS group, then the PUSCH transmission over the plurality of repetitions is as follows:

PUSCH is transmitted in a first sub-set of repetitions among the plurality of repetitions using the precoder layers associated with the indicated SRS resources in the first SRS group.

PUSCH is transmitted in a second sub-set of repetitions among the plurality of repetitions using the precoder layers associated with the indicated SRS resources in the second SRS group.

Figure 6:
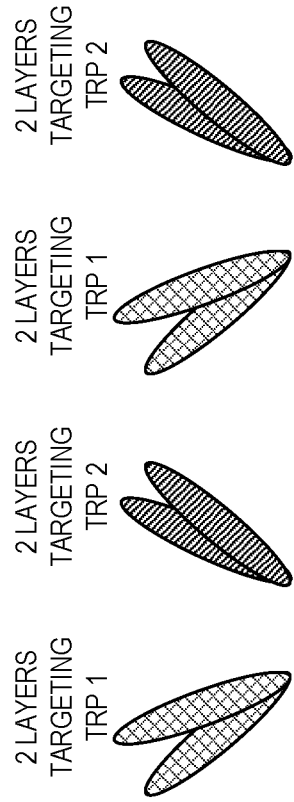
FIG. 6 illustrates an example embodiment of the present disclosure in which SRS resources 1 and 2 in SRS resource group 1 that are indicated via the SRS Resource Indication (SRI) field and the precoder layers calculated on a first NZP CSI-RS associated with SRS resource group 1 are used for transmitting up to L=2 layers in a first PUSCH transmission occasion, and SRS resources 3 and 4 in SRS resource group 2 that are indicated via the SRI field and the precoder layers calculated on a second NZP CSI-RS associated with SRS resource group 2 are used for transmitting up to L=2 layers in a PUSCH transmission occasion.

An example is shown in FIG. 6. In this example, SRS resources 1 and 2 in SRS resource group 1 that are indicated via the SRI field and the precoder layers calculated on the $1^{st}$ NZP CSI-RS associated with SRS group 1 are used for transmitting up to Z=2 layers in the $1^{st}$ PUSCH transmission occasion. Similarly, the SRS resources 3 and 4 in SRS group 2 that are indicated via the SRI field and the precoder layers calculated on the $2^{nd}$ NZP CSI-RS associated with SRS group 2 are used for transmitting up to L=2 layers in the $2^{nd}$ PUSCH transmission occasion.

In some embodiments, the number of SRS resources belonging to each SRS resource group indicated via SRI field should be the same in order to support the same number of layers transmitted in each repetition. For example, if an SRI indicates 4 SRS resources, then there must be 2 SRS resources belonging to each SRS resource group; and if SRI indicates 2 SRS resources, then there must be 1 SRS resource belonging to each SRS resource group. If SRI indicates only a single SRS resource, then this corresponds to a single layer PUSCH transmission using the spatial relation of indicated SRS resource in all the repetitions. In some embodiments, the SRS group is configured to an SRS resource by including an SRS group ID per SRS resource configuration.

In some embodiments, the maximum number of layers per PUSCH repetition is limited to 1 layer. In this embodiment, the UE maps the indicated SRI(s) to the same DM-RS port and its corresponding PUSCH layer 0 in all the repetitions. That is, the SRS port in the multiple SRS resources in the SRS resource set indicated via the SRI field is in indexed as $p_i=1000$ irrespective of i.

In another embodiment, the maximum number of layers per PUSCH repetition is limited to L layers where the value of L may be a UE capability (e.g., whether a UE supports two PUSCH layers (i.e., L=2) per repetition is reported as part of UE capability).

In some embodiments, the number of SRS resources belonging to each SRS resource group indicated via SRI field should be the same in order to support the same number of layers transmitted in each repetition. For example, if an SRI indicates 4 SRS resources that belong to 2 different SRS groups, then there must be 2 SRS resources belonging to each SRS resource group; and if SRI indicates 2 SRS resources, then there must be 1 SRS resource belonging to each SRS resource group. If SRI indicates only a single SRS resource, then this corresponds to a single layer PUSCH transmission using the spatial relation of indicated SRS resource in all the repetitions. In some embodiments, the SRS group is configured to an SRS resource by including an SRS group ID per SRS resource configuration.

Figure 7:
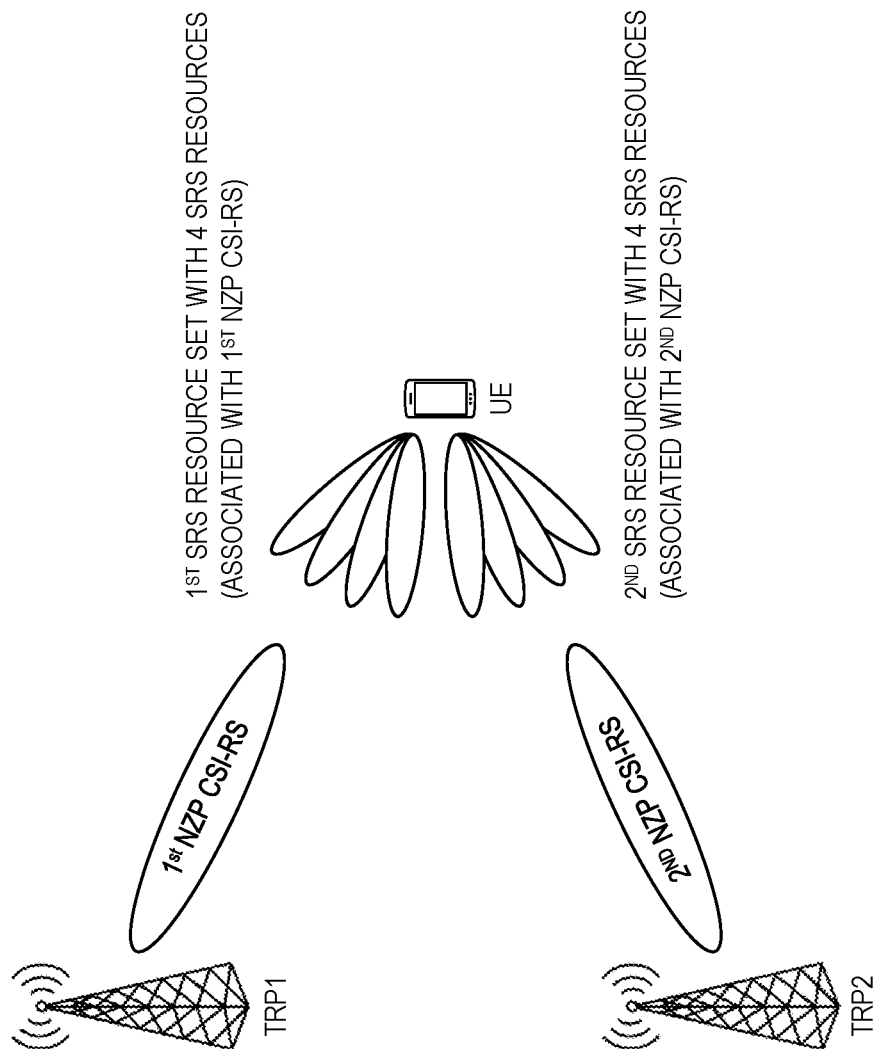
FIG. 7 illustrates an example embodiment in which multiple NZP CSI-RS resources are configured via multiple SRS resource sets.

Embodiment 2: Configuring Multiple NZP CSI-RS Resources Via Multiple SRS Resource Sets In this embodiment, instead of configuring groups within a single SRS Resource set as in Embodiment 1, multiple SRS resource sets may be configured by RRC for a UE, each may be associated with a TRP through an associated NZP CSI-RS resource. That is, multiple SRS resource sets are configured to the UE for the purpose of non-codebook based PUSCH transmission with higher layer parameter usage being set to 'nonCodeBook', and each of the multiple SRS resource sets have an associated NZP CSI-RS resource configured. Each SRS resource set may contain one or more SRS resources each with a single SRS port. An example is shown in FIG. 7, where two SRS resource sets each with four SRS resources are configured for a UE and each SRS resource set is associated with an NZP CSI-RS transmitted from a TRP. Each NZP CSI-RS may contain one or more NZP CSI-RS ports.

One or more SRS resource sets may be dynamically indicated in DCI together with one or more SRS resources in the SRS resource set to a UE where the DCI schedules a non-codebook based PUSCH transmission. For example, if two SRS resource sets are configured, either the first SRS resource set, the second SRS resource set, or both the first and the second SRS resource sets may be indicated to the UE. When both SRS resource sets are indicated, the UE would transmit the PUSCH according to the first SRS resource set in the first PUSCH transmission occasion and according to the second SRS resource set in the second PUSCH transmission occasion. If more than two transmission occasions are configured or indicated, the pattern of $\{1^{st}$ SRS resource set, $2^{nd}$ SRS resource set$\}$ may be repeated for the rest of the transmission occasions.

Figure 8:
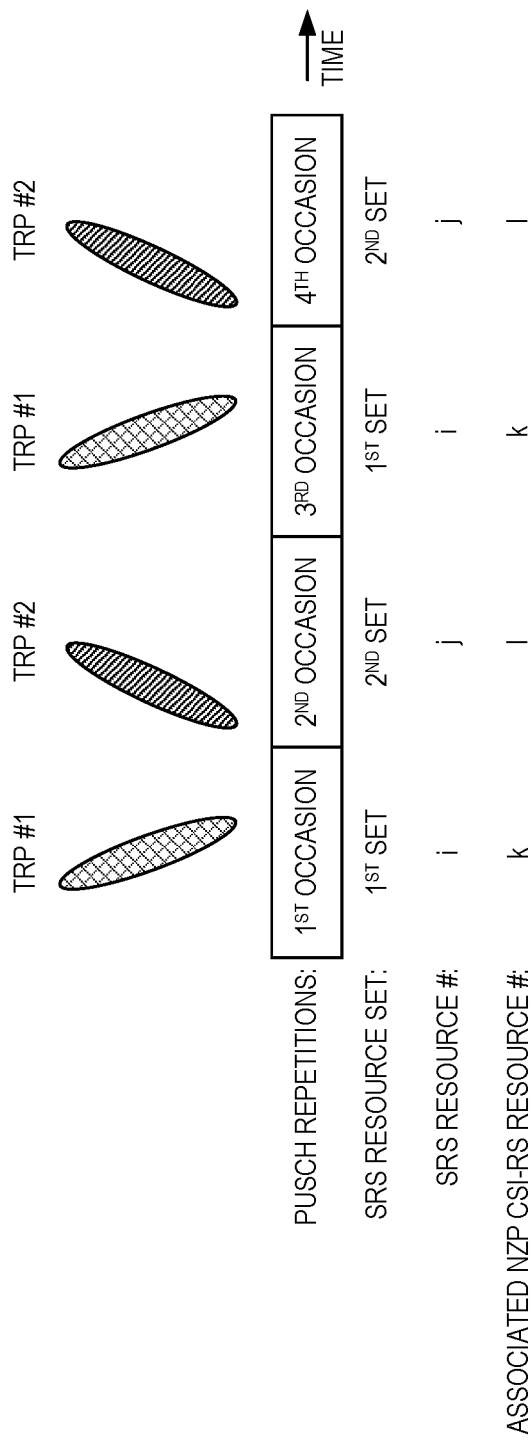
FIG. 8 illustrates an example non-codebook based uplink transmission in which there are four uplink transmission occasions and two SRS resource sets with a single layer transmission in which one SRS resource is selected in each SRS resource set in accordance with an embodiment of the preset disclosure.

An example is shown in FIG. 8 with four PUSCH transmission occasions and two SRS resource sets and with a single layer transmission in which one SRS resource is selected in each SRS resource set. The first SRS resource set is associated with TRP #1 while the second SRS resource is associated with TRP #2. For each SRS resource set, one or more SRS resource may be indicated by an SRI indicator. The SRS resources may be either separately indicated, e.g., one SRI bit field for each SRS resource set in the DCI, or jointly indicated with a single SRI bit field.

In another embodiment, other patterns may be used instead. For example, the first SRS resource set may be used in the first two PUSCH transmission occasions and the second SRS resource set in the next two PUSCH transmission occasions. The same pattern may be repeated if more than four transmission occasions are configured or indicated.

Embodiment 3: Configuring Multiple NZP CSI-RS Resources Via SRS Resources with Multiple Ports In one embodiment, a single SRS resource set is associated with N>1 NZP CSI-RS resources as well as M N-port SRS resources. For each received NZP CSI-RS, the UE determines M PUSCH layers to be sounded using SRS. The SRS resources are then utilized such that port n of SRS resource m is sounding PUSCH layer m derived from NZP CSI-RS resource n.

The gNB measures on the transmitted SRS resources and indicates one or more SRIs, each SRI corresponding to a subset of SRS resources. For each indicated SRI, an associated NZP CSI-RS resource is also indicated. The gNB can indicate a single "SRI and NZP CSI-RS resource" pair for dynamic point selection, i.e., to enable single-TRP PUSCH transmission towards the best TRP out of the N candidates. If single-TRP with NZP CSI-RS resource n is indicated, PUSCH transmission will be carried out using the PUSCH layers sounded for SRS transmission on port n on the SRS resources indicated by the SRI. Multiple repetitions, if configured, will then be directed towards the same TRP. The gNB can indicate multiple "SRI and NZP CSI-RS resource" pairs for repeated PUSCH transmission towards multiple TRPs. Each indicated "SRI and NZP CSI-RS resource" pair will correspond to a set of sounded PUSCH layers, similarly as in the single-TRP case, and these different sets of PUSCH layers can be used in different repetitions of the PUSCH transmission. This will enable different repetitions of the PUSCH transmission to be directed towards different TRPs.

Additional Description

Figure 9:
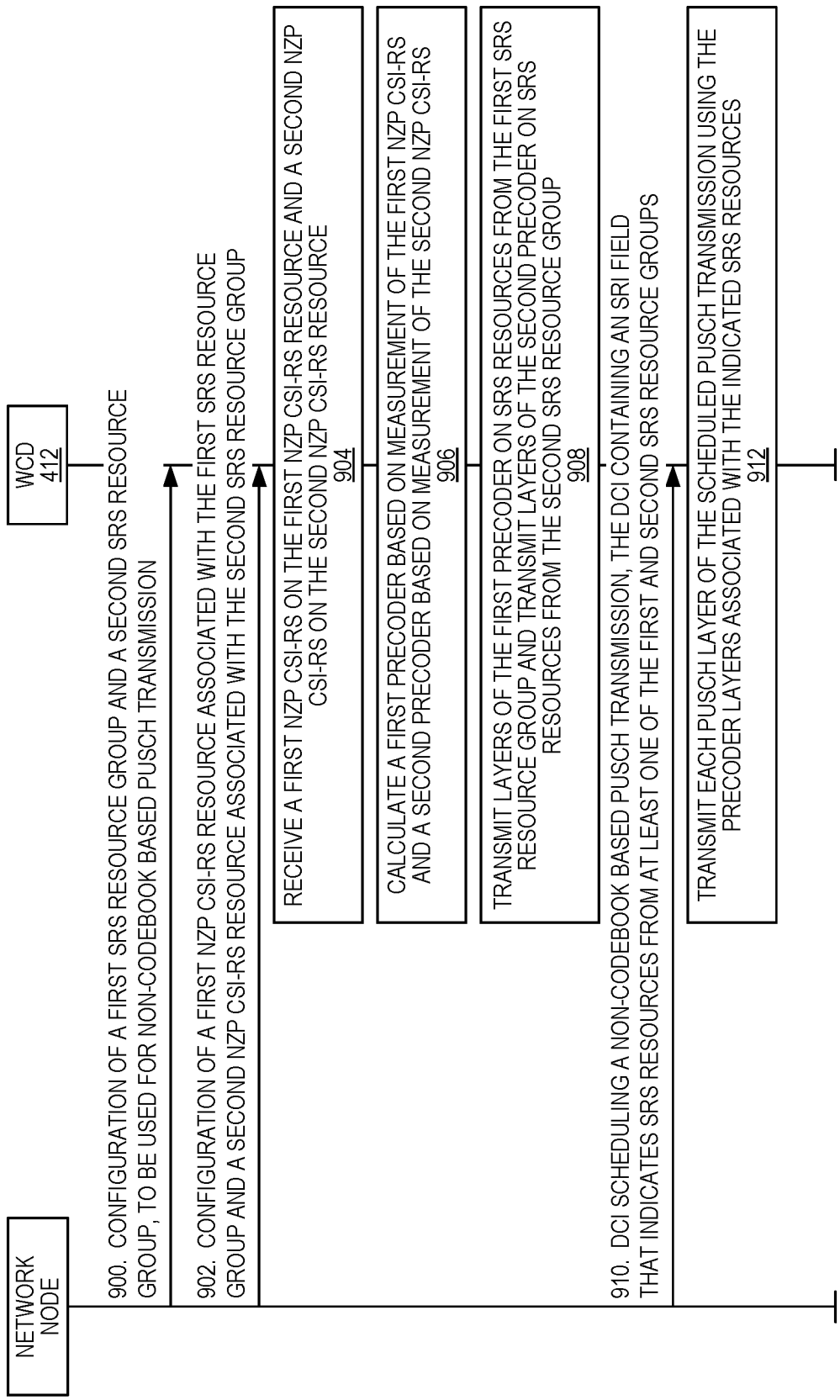
FIG. 9 illustrates the operation of a wireless communication device (e.g., a User Equipment (UE)) and a network node (e.g., a base station) in accordance with at least some aspects of the embodiments described herein.

FIG. 9 illustrates the operation of a wireless communication device 412 (e.g., a UE) and a network node (e.g., a base station 402 or gNB) in accordance with at least some aspects of at least some of the embodiments described above. Note that according to some embodiments, one or more of the steps in FIG. 9 can be performed, while other steps are optional. Note that this example is for two SRS resource groups/sets. However, this process is extendible to any number of SRS resource groups/sets.

As illustrated, the wireless communication device 412 receives, from the network node, a configuration of a first SRS resource group to be used for non-codebook based PUSCH transmission and a second SRS resource group to be used for non-codebook based PUSCH transmission (step 900). In one embodiment (e.g., see Embodiment 1), the first and second SRS resource groups are included in a single SRS resource set. In some embodiments, the single SRS resource set is associated with a higher layer parameter configured by the network to indicate, to the wireless communication device 412, to use non-codebook based precoding for uplink transmissions associated with the single SRS resource set. In another embodiment (e.g., see Embodiment 2), the first SRS resource group corresponds to a first SRS resource set, and the second SRS resource group corresponds to a second SRS resource set. In one embodiment, the first SRS resource set is associated with a first higher layer parameter configured by the network to indicate, to the wireless communication device 412, to use non-codebook based precoding for uplink transmissions associated with the first SRS resource set, and the second SRS resource set is associated with a second higher layer parameter configured by the network to indicate, to the wireless communication device 412, to use non-codebook based precoding for uplink transmissions associated with the second SRS resource set.

The wireless communication device 412 receives, from the network node, a configuration of a first NZP CSI-RS associated with the first SRS resource group and a second NZP CSI-RS associated with the second SRS resource group (step 902). As described above, at least in some embodiments, the first NZP CSI-RS (and thus the first SRS resource group) is associated to a first TRP, and the second NZP CSI-RS (and thus the second SRS resource group) is associated to a second TRP.

The wireless communication device 412 receives a first NZP CSI-RS on the first NZP CSI-RS resource and a second NZP CSI-RS on the second NZP CSI-RS resource (step 904). The wireless communication device 412 calculates a first precoder based on measurement of the first NZP CSI-RS and a second precoder based on measurement of the second NZP CSI-RS (step 906).

The first and second precoders may then be used for a subsequent non-codebook based PUSCH transmission. More specifically, in this example, the wireless communication device 412 transmits layers of the first precoder on SRS resources from the first group and transmits layers of the second precoder on SRS resources from the second group (step 908). Note that other variations of this step are described above. For sake of clarity, these other variations include, e.g., in some embodiments, the wireless communication device 412 transmits a first PUSCH or a first set of layers of a PUSCH on antenna ports corresponding to SRS resources in the first SRS group and transmits a second PUSCH or a second set of layers of a PUSCH on antenna ports corresponding to SRS resources in the second SRS group. The wireless communication device 412 subsequently receives a DCI scheduling the non-codebook based PUSCH transmission, where the DCI contains an SRI field indicating SRS resources from at least one of the first and second SRS groups (step 910). The wireless communication device 412 transmits each PUSCH layer of the non-codebook based PUSCH transmission using the precoder layers associated with the SRS resources indicated in the SRI field (step 912).

In some embodiments, the non-codebook based PUSCH transmission is comprised of a plurality of repetitions. Further, in some embodiments, if the SRI field indicates SRS resources from the first SRS resource group, the PUSCH transmission in a first sub-set of repetitions among the plurality of repetitions uses layers of the first precoder associated with the SRS resources in the first SRS group, responsive to the SRI field indicating SRS resources from the first SRS group. If the SRI field indicates SRS resources from the second SRS resource group, the PUSCH transmission in a second sub-set of repetitions among the plurality of repetitions uses layers of the second precoder associated with the SRS resources in the second SRS group, responsive to the SRI field indicating SRS resources from the second SRS resource group. If the SRI field indicates SRS resources from only the first SRS resource group, the PUSCH transmission in all of the plurality repetitions uses layers of the first precoder associated with the SRS resources in the first SRS group, responsive to the SRI field indicating SRS resources from only the first SRS resource group. If the SRI field indicates SRS resources from only the second SRS resource group, the PUSCH transmission in all of the plurality repetitions uses layers of the second precoder associated with the SRS resources in the second SRS group, responsive to the SRI field indicating SRS resources from only the second SRS resource group.

Figure 10:
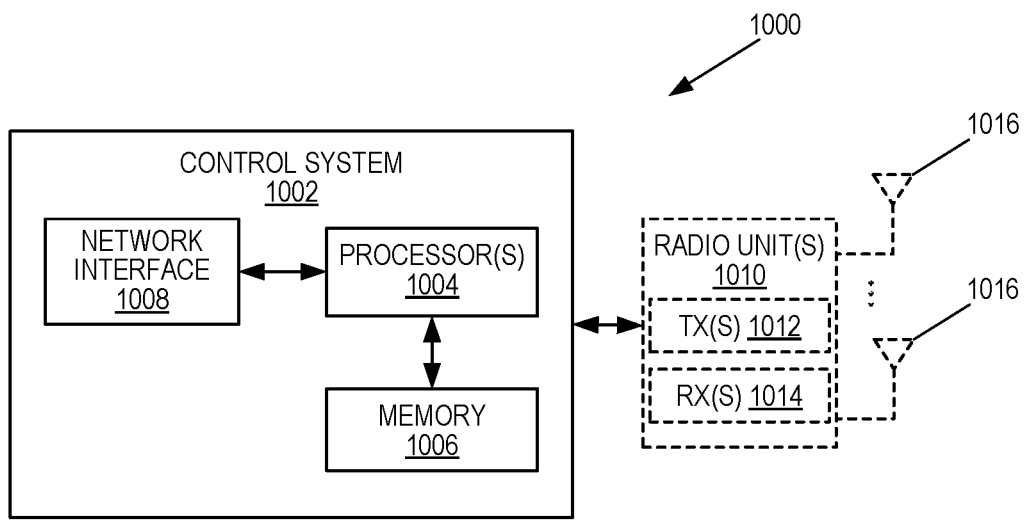
FIGS. 10 through 12 are schematic block diagrams of example embodiments of a radio access node.

FIG. 10 is a schematic block diagram of a radio access node 1000 according to some embodiments of the present disclosure. Optional features are represented by dashed boxes. The radio access node 1000 may be, for example, a base station 402 or 406 or a network node that implements all or part of the functionality of the base station 402 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
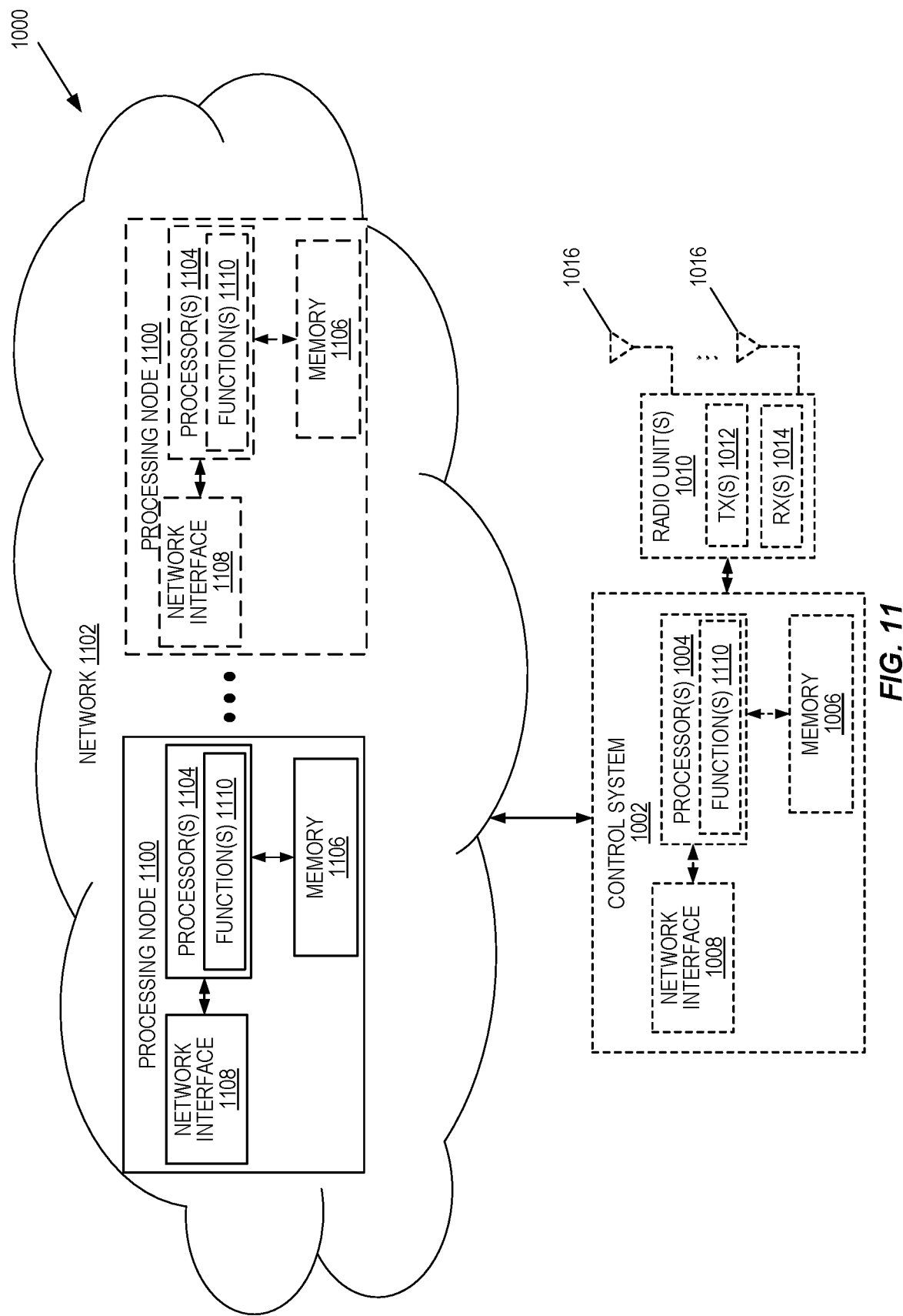

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAS, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
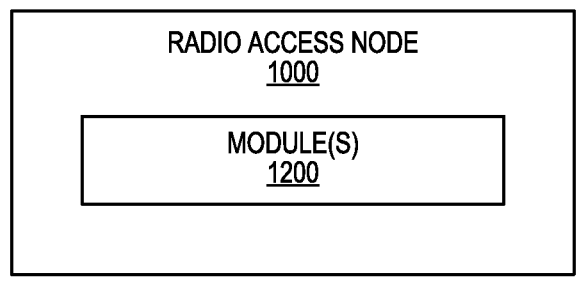

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
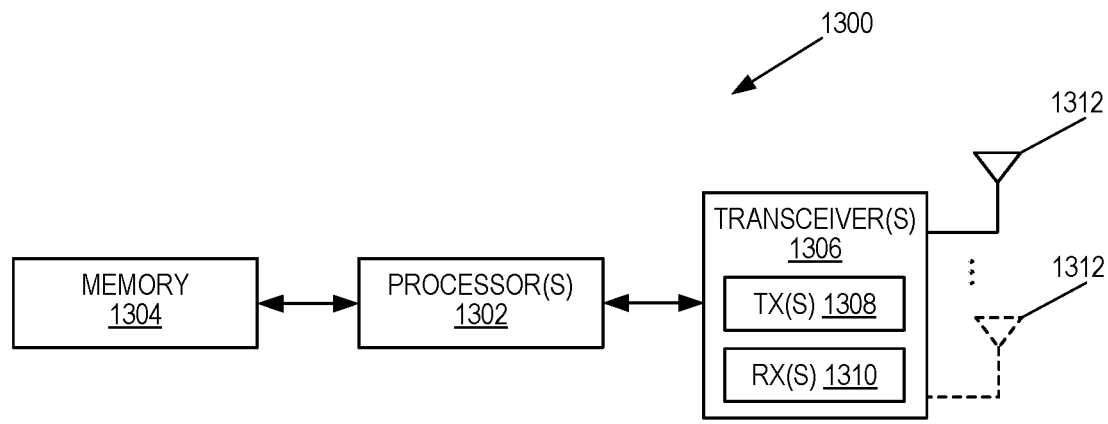
FIGS. 13 and 14 are schematic block diagrams of example embodiments of a wireless communication device.

FIG. 13 is a schematic block diagram of a wireless communication device 1300 according to some embodiments of the present disclosure. The wireless communication device 1300 implements all or part of the functionality of the wireless communication device 412 or UE described herein. As illustrated, the wireless communication device 1300 includes one or more processors 1302 (e.g., CPUs, ASICS, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
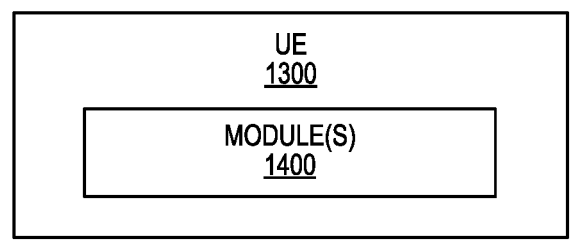

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Figure 15:
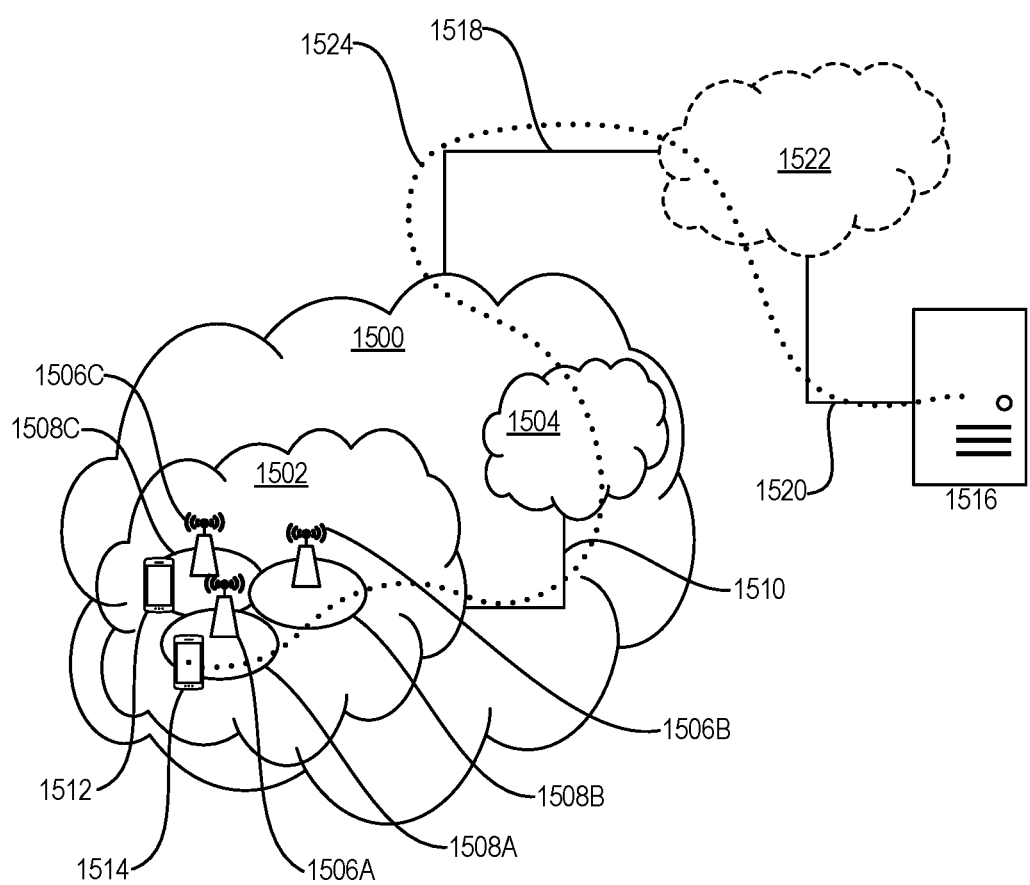
FIG. 15 illustrates an example embodiment of a communication system in which embodiments of the present disclosure may be implemented.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
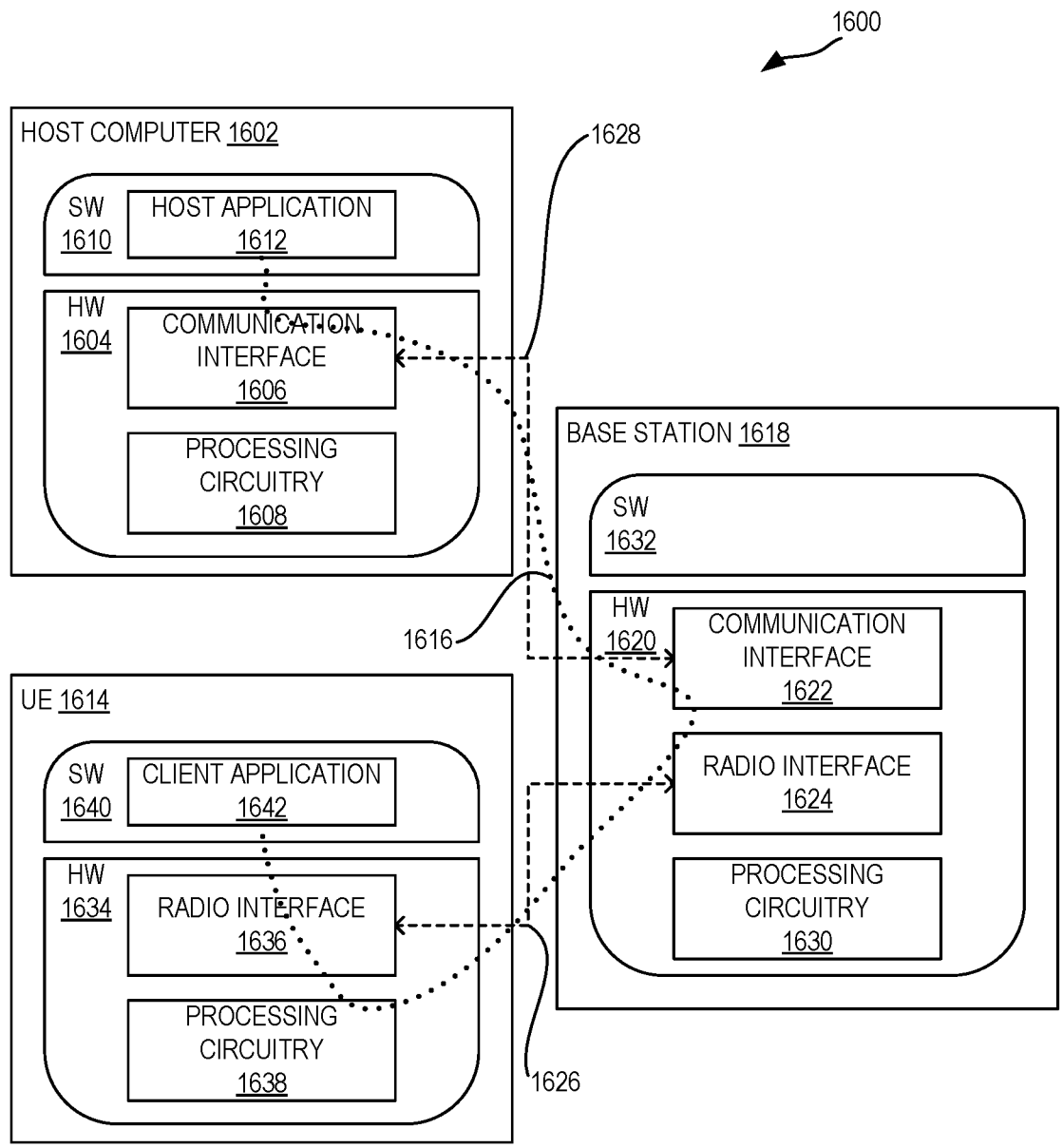
FIG. 16 illustrates example embodiments of the host computer, base station, and UE of FIG. 15.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
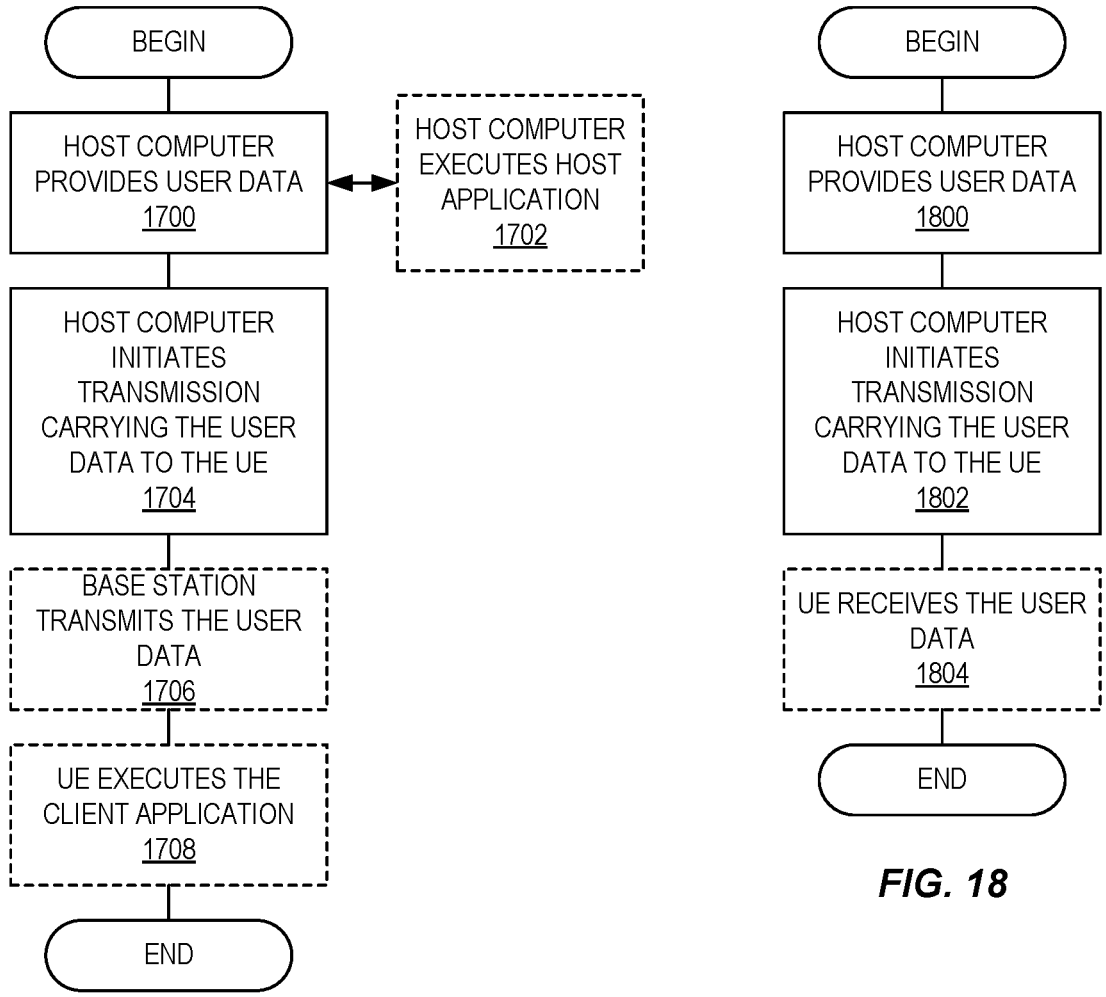
FIGS. 17 through 20 are flow charts that illustrate example embodiments of methods implemented in a communication system such as that of FIG. 15.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

Figures 19, 20:
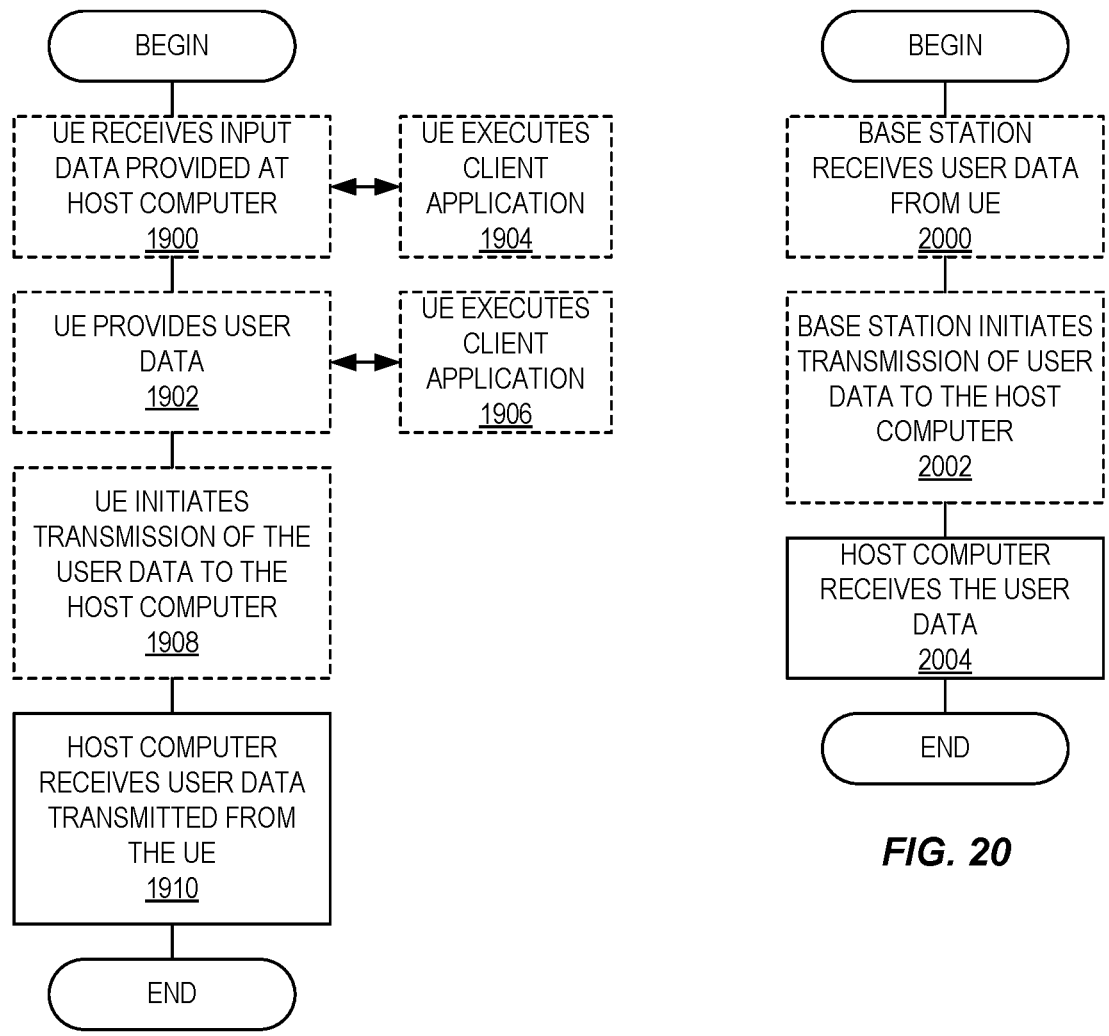

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (412) comprising one or more of the following: receiving (900), from a network node (402), a configuration of a first SRS resource group to be used for non-codebook based PUSCH transmission and a second SRS resource group to be used for non-codebook based PUSCH transmission; receiving (902), from the network node (402), a configuration of a first NZP CSI-RS associated with the first SRS resource group and a second NZP CSI-RS associated with the second SRS resource group; receiving (904) a first NZP CSI-RS on the first NZP CSI-RS resource and a second NZP CSI-RS on the second NZP CSI-RS resource; calculating (906) a first precoder based on measurement(s) of the first NZP CSI-RS and a second precoder based on measurement(s) of the second NZP CSI-RS.

Embodiment 2: The method of embodiment 1 further comprising one or more of the following: transmitting (908) layers of the first precoder on SRS resources from the first group; and transmitting (908) layers of the second precoder on SRS resources from the second group.

Embodiment 3: The method of embodiment 2 further comprising one or more of the following: receiving (910) a DCI scheduling the non-codebook based PUSCH transmission, the DCI containing an SRI field indicating SRS resources from at least one of the first and second SRS groups; transmitting (912) each PUSCH layer of the non-codebook based PUSCH transmission using the precoder layers associated with the SRS resources indicated in the SRI field.

Embodiment 4: The method of embodiment 3 wherein the non-codebook based PUSCH transmission is comprised of a plurality of repetitions.

Embodiment 5: The method of embodiment 4 wherein one or more of the following hold: the SRI field indicates SRS resources from the first SRS resource group; and the PUSCH transmission in a first sub-set of repetitions among the plurality of repetitions uses layers of the first precoder associated with the SRS resources in the first SRS group, responsive to the SRI field indicating SRS resources from the first SRS group.

Embodiment 6: The method of embodiment 4 wherein one or more of the following hold: the SRI field indicates SRS resources from the second SRS resource group; and the PUSCH transmission in a second sub-set of repetitions among the plurality of repetitions uses layers of the second precoder associated with the SRS resources in the second SRS group, responsive to the SRI field indicating SRS resources from the second SRS resource group.

Embodiment 7: The method of embodiment 4 wherein one or more of the following hold: the SRI field indicates SRS resources from only the first SRS resource group; and the PUSCH transmission in all of the plurality repetitions uses layers of the first precoder associated with the SRS resources in the first SRS group, responsive to the SRI field indicating SRS resources from only the first SRS resource group.

Embodiment 8: The method of embodiment 4 wherein one or more of the following hold: the SRI field indicates SRS resources from only the second SRS resource group; and the PUSCH transmission in all of the plurality repetitions uses layers of the second precoder associated with the SRS resources in the second SRS group, responsive to the SRI field indicating SRS resources from only the second SRS resource group.

Embodiment 9: The method of any of embodiments 1 to 8 wherein the first SRS resource group and the second SRS resource group are comprised in a single SRS resource set.

Embodiment 10: The method of embodiment 9 wherein the single SRS resource set is associated with a higher layer parameter configured by the network to indicate, to the wireless communication device, to use non-codebook based precoding for uplink transmissions associated with the single SRS resource set.

Embodiment 11: The method of any of embodiments 1 to 8 wherein the first SRS resource group corresponds to a first SRS resource set, and the second SRS resource group corresponds to a second SRS resource set.

Embodiment 12: The method of embodiment 11 wherein the first SRS resource set is associated with a first higher layer parameter configured by the network to indicate, to the wireless communication device, to use non-codebook based precoding for uplink transmissions associated with the first SRS resource set, and the second SRS resource set is associated with a second higher layer parameter configured by the network to indicate, to the wireless communication device, to use non-codebook based precoding for uplink transmissions associated with the second SRS resource set.

Embodiment 13: The method of any of the previous embodiments, further comprising: providing user data; and forwarding the user data to a host computer via the transmission to the base station.

Group B Embodiments

Embodiment 14: A method performed by a base station (402) comprising one or more of the following: providing (900), to a wireless communication device (412), a configuration of a first SRS resource group to be used for non-codebook based PUSCH transmission and a second SRS resource group to be used for non-codebook based PUSCH transmission; providing (902), to the wireless communication device (412), a configuration of a first NZP CSI-RS associated with the first SRS resource group and a second NZP CSI-RS associated with the second SRS resource group.

Embodiment 15: The method of embodiment 14 further comprising: providing (910), to the wireless communication device (412), a DCI scheduling a non-codebook based PUSCH transmission, the DCI containing an SRI field indicating SRS resources from at least one of the first and second SRS groups.

Embodiment 16: The method of embodiment 15 wherein the non-codebook based PUSCH transmission is comprised of a plurality of repetitions.

Embodiment 17: The method of embodiment 16 wherein one or more of the following hold: the SRI field indicates SRS resources from the first SRS resource group; and the PUSCH transmission in a first sub-set of repetitions among the plurality of repetitions uses layers of a first precoder associated with the SRS resources in the first SRS group, responsive to the SRI field indicating SRS resources from the first SRS group.

Embodiment 18: The method of embodiment 16 wherein one or more of the following hold: the SRI field indicates SRS resources from the second SRS resource group; and the PUSCH transmission in a second sub-set of repetitions among the plurality of repetitions uses layers of a second precoder associated with the SRS resources in the second SRS group, responsive to the SRI field indicating SRS resources from the second SRS resource group.

Embodiment 19: The method of embodiment 16 wherein one or more of the following hold: the SRI field indicates SRS resources from only the first SRS resource group; and the PUSCH transmission in all of the plurality repetitions uses layers of a first precoder associated with the SRS resources in the first SRS group, responsive to the SRI field indicating SRS resources from only the first SRS resource group.

Embodiment 20: The method of embodiment 16 wherein one or more of the following hold: the SRI field indicates SRS resources from only the second SRS resource group; and the PUSCH transmission in all of the plurality repetitions uses layers of a second precoder associated with the SRS resources in the second SRS group, responsive to the SRI field indicating SRS resources from only the second SRS resource group.

Embodiment 21: The method of any of embodiments 14 to 20 wherein the first SRS resource group and the second SRS resource group are comprised in a single SRS resource set.

Embodiment 22: The method of embodiment 21 wherein the single SRS resource set is associated with a higher layer parameter configured by the network to indicate, to the wireless communication device, to use non-codebook based precoding for uplink transmissions associated with the single SRS resource set.

Embodiment 23: The method of any of embodiments 14 to 20 wherein the first SRS resource group corresponds to a first SRS resource set, and the second SRS resource group corresponds to a second SRS resource set.

Embodiment 24: The method of embodiment 23 wherein the first SRS resource set is associated with a first higher layer parameter configured by the network to indicate, to the wireless communication device, to use non-codebook based precoding for uplink transmissions associated with the first SRS resource set, and the second SRS resource set is associated with a second higher layer parameter configured by the network to indicate, to the wireless communication device, to use non-codebook based precoding for uplink transmissions associated with the second SRS resource set.

Embodiment 25: The method of any of the previous embodiments, further comprising: obtaining user data; and forwarding the user data to a host computer or a wireless device.

Group C Embodiments

Embodiment 26: A wireless device comprising: processing circuitry configured to perform any of the steps of any of the Group A embodiments; and power supply circuitry configured to supply power to the wireless device.

Embodiment 27: A base station comprising: processing circuitry configured to perform any of the steps of any of the Group B embodiments; and power supply circuitry configured to supply power to the base station.

Embodiment 28: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 29: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 30: The communication system of the previous embodiment further including the base station.

Embodiment 31: The communication system of the previous 2 embodiments, further including the UE, wherein the UE is configured to communicate with the base station.

Embodiment 32: The communication system of the previous 3 embodiments, wherein: the processing circuitry of the host computer is configured to execute a host application, thereby providing the user data; and the UE comprises processing circuitry configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 34: The method of the previous embodiment, further comprising, at the base station, transmitting the user data.

Embodiment 35: The method of the previous 2 embodiments, wherein the user data is provided at the host computer by executing a host application, the method further comprising, at the UE, executing a client application associated with the host application.

Embodiment 36: A User Equipment, UE, configured to communicate with a base station, the UE comprising a radio interface and processing circuitry configured to perform the method of the previous 3 embodiments.

Embodiment 37: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 38: The communication system of the previous embodiment, wherein the cellular network further includes a base station configured to communicate with the UE.

Embodiment 39: The communication system of the previous 2 embodiments, wherein: the processing circuitry of the host computer is configured to execute a host application, thereby providing the user data; and the UE's processing circuitry is configured to execute a client application associated with the host application.

Embodiment 40: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 41: The method of the previous embodiment, further comprising at the UE, receiving the user data from the base station.

Embodiment 42: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 43: The communication system of the previous embodiment, further including the UE.

Embodiment 44: The communication system of the previous 2 embodiments, further including the base station, wherein the base station comprises a radio interface configured to communicate with the UE and a communication interface configured to forward to the host computer the user data carried by a transmission from the UE to the base station.

Embodiment 45: The communication system of the previous 3 embodiments, wherein: the processing circuitry of the host computer is configured to execute a host application; and the UE's processing circuitry is configured to execute a client application associated with the host application, thereby providing the user data.

Embodiment 46: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 47: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 48: The method of the previous embodiment, further comprising, at the UE, providing the user data to the base station.

Embodiment 49: The method of the previous 2 embodiments, further comprising: at the UE, executing a client application, thereby providing the user data to be transmitted; and at the host computer, executing a host application associated with the client application.

Embodiment 50: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 51: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 52: The communication system of the previous embodiment further including the base station.

Embodiment 53: The communication system of the previous 2 embodiments, further including the UE, wherein the UE is configured to communicate with the base station.

Embodiment 54: The communication system of the previous 3 embodiments, wherein: the processing circuitry of the host computer is configured to execute a host application; and the UE is configured to execute a client application associated with the host application, thereby providing the user data to be received by the host computer.

Embodiment 55: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 56: The method of the previous embodiment, further comprising at the base station, receiving the user data from the UE.

Embodiment 57: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless communication device comprising:
  receiving, from a network node, a configuration of a first Sounding Reference Signal, SRS, resource set to be used for non-codebook based Physical Uplink Shared Channel, PUSCH, transmission and a second SRS resource set to be used for non-codebook based PUSCH transmission;
  receiving, from the network node, a configuration of a first Non-Zero Power, NZP, Channel State Information Reference Signal, CSI-RS, associated with the first SRS resource set and a second NZP CSI-RS associated with the second SRS resource set;
  receiving a request for transmitting data in PUSCH in a plurality of occasions, wherein the request comprises:
    an indication that data transmission in PUSCH in the plurality of occasions is based on both the first SRS resource set and the second SRS resource set;
    a first SRS resource indicator, SRI, associated with the first SRS resource set; and
    a second SRI associated with the second SRS resource set; and
  transmitting a first PUSCH in a first set of occasions according to the first SRI and a second PUSCH in a second set of occasions according to the second SRI, wherein the first PUSCH comprises a first SRS according to the first SRI and the second PUSCH comprises a second SRS according to the second SRI.

2. The method of claim 1, wherein the first SRS resource set is associated with a first transmission and reception point, TRP, and the second SRS resource set is associated with a second TRP.

3. The method of claim 1, wherein the first SRI indicates one or more SRS resources in the first SRS resource set and the second SRI indicates one or more SRS resources in the second SRS resource set.

4. The method of claim 1, wherein the first PUSCH and the second PUSCH carry a same block of data.

5. The method of claim 1, wherein the first set of occasions and the second set of occasions comprise a first set of time occasions and a second set of time occasions, respectively.

6. The method of claim 5, wherein the request further comprises the total of N slots.

7. The method of claim 1, wherein a first occasion from the first set of occasions and a second occasion from the second set of occasions are in different time slots.

8. The method of claim 1, wherein a first occasion from the first set of occasions and a second occasion from the second set of occasion are in different symbols within a same slot.

9. The method of claim 1, wherein the first and the second SRIs indicate a same number of SRS resources in the first SRS resource set and the second SRS resource set, respectively.

10. The method of claim 9, wherein a single SRS resource in each of the first and the second SRS resource sets is indicated by the first SRI and the second SRI, respectively.

11. The method of claim 9, wherein the number of SRS resources indicated in the first SRI and the second SRI is a wireless communication device capability reported by the wireless communication device to the network node.

12. The method of claim 1, wherein the first SRS resource set is associated with a first phase tracking reference signal, PTRS, port and the second SRS resource set is associated with a second PTRS port.

13. The method of claim 1 wherein transmitting the first PUSCH in the first set of occasions according to the first SRI and the second PUSCH in the second set of occasions according to the second SRI comprises:
transmitting the first PUSCH on antenna port(s) that correspond to the one or more SRS resources indicated by the first SRI in the first SRS resource set; and
transmitting the second PUSCH on antenna port(s) that correspond to the one or more SRS resources indicated by the second SRI in the second SRS resource set.

14. The method of claim 1, further comprising:
transmitting a first set of layers of a PUSCH on antenna ports that correspond to SRS resources in the first SRS resource set; and
transmitting a second set of layers of the PUSCH on antenna ports that correspond to SRS resources in the second SRS resource set.

15. The method of claim 1, wherein the request is contained in a Downlink Control Information, DCI, that schedules the PUSCH transmission.

16. The method of claim 15, wherein the DCI contains a first SRI field for indicating the first SRI and a second SRI field for indicating the second SRI.

17. The method of claim 15, wherein the DCI contains a single SRI field for both the first SRI and the second SRI.

18. The method of claim 1, wherein the request is contained in a radio resource control, RRC, configuration for a configured grant.

19. The method of claim 1, wherein the first SRS resource set is associated with a first higher layer parameter configured by the network node to indicate, to the wireless communication device, to use non-codebook based PUSCH for uplink transmissions associated with the first SRS resource set, and the second SRS resource set is associated with a second higher layer parameter configured by the network node to indicate, to the wireless communication device, to use non-codebook based PUSCH for uplink transmissions associated with the second SRS resource set.

20. The method of claim 1 where the first NZP CSI-RS and the second NZP CSI-RS have the same time-domain behavior.

21. The method of claim 20 where the time domain behavior is one of aperiodic, semi-persistent, and periodic.

22. A wireless communication device comprising:
one or more transmitters;
one or more receivers; and
processing circuitry associated with the one or more transmitters and the one or more receivers, the processing circuitry configured to cause the wireless communication device to:
receive, from a network node, a configuration of a first Sounding Reference Signal, SRS, resource set to be used for non-codebook based Physical Uplink Shared Channel, PUSCH, transmission and a second SRS resource set to be used for non-codebook based PUSCH transmission;
receive, from the network node, a configuration of a first Non-Zero Power, NZP, Channel State Information Reference Signal, CSI-RS, associated with the first SRS resource set and a second NZP CSI-RS associated with the second SRS resource set;
receive a request for transmitting data in PUSCH in a plurality of occasions, wherein the request comprises:
an indication that data transmission in PUSCH in the plurality of occasions is based on both the first SRS resource set and the second SRS resource set;
a first SRS resource indicator, SRI, associated with the first SRS resource set; and
a second SRI associated with the second SRS resource set; and
transmit a first PUSCH in a first set of occasions according to the first SRI and a second PUSCH in a second set of occasions according to the second SRI, wherein the first PUSCH comprises a first SRS according to the first SRI and the second PUSCH comprises a second SRS according to the second SRI.

23. A method performed by a network node comprising:
providing, to a wireless communication device, a configuration of a first Sounding Reference Signal, SRS, resource set to be used for non-codebook based Physical Uplink Shared Channel, PUSCH, transmission and a second SRS resource set to be used for non-codebook based PUSCH transmission;
providing, to the wireless communication device, a configuration of a first Non-Zero Power, NZP, Channel State Information Reference Signal, CSI-RS, associated with the first SRS resource set and a second NZP CSI-RS associated with the second SRS resource set;
transmitting, to the wireless communication device, a request for transmitting data in PUSCH in a plurality of occasions, wherein the request comprises:
an indication that data transmission in PUSCH in the plurality of occasions is based on both the first SRS resource set and the second SRS resource set;
a first SRS resource indicator, SRI, associated with the first SRS resource set; and
a second SRI associated with the second SRS resource set; and
receiving a first PUSCH in a first set of occasions with a first transmission and reception point, TRP, and a second PUSCH in a second set of occasions with a second TRP, wherein the first PUSCH comprises a first SRS according to the first SRI and the second PUSCH comprises a second SRS according to the second SRI.

24. The method of claim 23, wherein the first SRI indicates one or more SRS resources in the first SRS resource set and the second SRI indicates one or more SRS resources in the second SRS resource set.

25. A network node comprising processing circuitry configured to cause the network node to:
provide, to a wireless communication device, a configuration of a first Sounding Reference Signal, SRS, resource set to be used for non-codebook based Physical Uplink Shared Channel, PUSCH, transmission and a second SRS resource set to be used for non-codebook based PUSCH transmission;

provide, to the wireless communication device, a configuration of a first Non-Zero Power, NZP, Channel State Information Reference Signal, CSI-RS, associated with the first SRS resource set and a second NZP CSI-RS associated with the second SRS resource set;
transmit, to the wireless communication device, a request for transmitting data in PUSCH in a plurality of occasions, wherein the request comprises:
   an indication that data transmission in PUSCH in the plurality of occasions is based on both the first SRS resource set and the second SRS resource set;
   a first SRS resource indicator, SRI, associated with the first SRS resource set; and
   a second SRI associated with the second SRS resource set; and
receive a first PUSCH in a first set of occasions with a first transmission and reception point, TRP, and a second PUSCH in a second set of occasions with a second TRP, wherein the first PUSCH comprises a first SRS according to the first SRI and the second PUSCH comprises a second SRS according to the second SRI.

* * * * *